(12) United States Patent
Saito et al.

(10) Patent No.: US 9,321,354 B2
(45) Date of Patent: Apr. 26, 2016

(54) ELECTRICALLY DRIVEN DUMP TRUCK

(75) Inventors: Shinjiro Saito, Kasumigaura (JP); Kichio Nakajima, Isesaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 68 days.

(21) Appl. No.: 14/346,207

(22) PCT Filed: May 10, 2012

(86) PCT No.: PCT/JP2012/061985
§ 371 (c)(1), (2), (4) Date: Mar. 20, 2014

(87) PCT Pub. No.: WO2013/046788
PCT Pub. Date: Apr. 4, 2013

(65) Prior Publication Data
US 2014/0224609 A1   Aug. 14, 2014

(30) Foreign Application Priority Data

Sep. 27, 2011   (JP) ................................. 2011-210752

(51) Int. Cl.
*B60L 5/00* (2006.01)
*B60L 5/08* (2006.01)
(Continued)

(52) U.S. Cl.
CPC ... *B60L 5/00* (2013.01); *B60L 5/08* (2013.01); *B60L 5/36* (2013.01); *B60L 9/22* (2013.01); *B60L 11/08* (2013.01); *B60L 15/20* (2013.01); *B60M 1/12* (2013.01); *B60M 7/00* (2013.01); *B60L 2200/26* (2013.01); *B60L 2200/36* (2013.01); *B60L 2240/12* (2013.01);
(Continued)

(58) Field of Classification Search
None
See application file for complete search history.

(56) References Cited

U.S. PATENT DOCUMENTS 3,924,084 A * 12/1975 Lindfors ................... B60L 5/10
                                                     191/45 A
4,424,875 A *  1/1984 Yoshida ................... B62D 1/28
                                                     180/168

(Continued)

FOREIGN PATENT DOCUMENTS

JP       53-6065        1/1978
JP       58-179803 U   12/1983
(Continued)

OTHER PUBLICATIONS

International Search Report issued in corresponding application No. PCT/JP2012/061985 on Jun. 12, 2012.

*Primary Examiner* — John R Olszewski
*Assistant Examiner* — Jess Whittington
(74) *Attorney, Agent, or Firm* — Brundidge & Stanger, P.C.

(57) ABSTRACT

A control device which executes the following control based on image information acquired by a camera: When the vehicle is traveling outside a trolley wire linkage section C, the control device executes control to give a yaw moment to the vehicle so that the vehicle travels while tracing a trolley wire 3R/3L. When the vehicle is traveling in the trolley wire linkage section C, the control device performs control not to execute the control to give the yaw moment. Further, the control device converts the acquired image information into coordinate information. Based on the coordinate information, when the vehicle is traveling outside the trolley wire linkage section C, the control device calculates a representative point of the vehicle and a target point situated on the trolley wire 3R/3L and gives a yaw moment to the vehicle so that the representative point approaches the target point.

6 Claims, 32 Drawing Sheets

(51) Int. Cl.
*B60L 5/36* (2006.01)
*B60M 7/00* (2006.01)
*B60L 9/22* (2006.01)
*B60L 11/08* (2006.01)
*B60L 15/20* (2006.01)
*B60M 1/12* (2006.01)

(52) U.S. Cl.
CPC ...... *B60L2240/421* (2013.01); *B60L 2240/423* (2013.01); *Y02T 10/642* (2013.01); *Y02T 10/70* (2013.01); *Y02T 10/7077* (2013.01); *Y02T 10/7275* (2013.01)

(56) References Cited

U.S. PATENT DOCUMENTS

| | | | | |
|---|---|---|---|---|
| 4,483,148 A | * | 11/1984 | Minami | B60L 9/22 180/65.245 |
| 4,488,234 A | * | 12/1984 | Stieber | G05D 1/0261 701/23 |
| 5,672,947 A | * | 9/1997 | Hisada | G05D 1/0263 318/580 |
| 6,421,600 B1 | * | 7/2002 | Ross | B60L 5/005 180/167 |
| 2009/0079997 A1 | * | 3/2009 | Watabe | B60M 1/28 356/636 |
| 2009/0320554 A1 | * | 12/2009 | Watabe | G01B 11/24 73/7 |

FOREIGN PATENT DOCUMENTS

| | | |
|---|---|---|
| JP | 2-272609 A | 11/1990 |
| JP | 5-278502 A | 10/1993 |

* cited by examiner

ELECTRICALLY DRIVEN DUMP TRUCK

TECHNICAL FIELD

The present invention relates to an electrically driven dump truck. In particular, to an electrically driven dump truck which travels by using electric power from trolley wires.

BACKGROUND ART

Some types of dump trucks that travel in mines are known as the series hybrid type. Such series hybrid type dump trucks generate electric power with a generator driven by the engine and supply the electric power to rear wheel motors for driving the rear wheels. By taking advantage of the electrical configuration of the series hybrid type, traveling technology based on the trolley system has been implemented. In the trolley-based traveling technology, trolley wires generally employed for electric trains are installed in prescribed climbing sections. In the climbing sections with trolley wires, a vehicle having power collectors (provided on the vehicle to be movable up and down) travels not by using the electric power supplied by the engine and the generator but by using electric power acquired from the trolley wires by elevating sliders of the power collectors to be in contact with the trolley wires (hereinafter referred to as "trolley traveling"). An example of the trolley-based traveling technology has been described in Patent Literature 1, for example. In this case, the drop in the traveling speed in the climbing sections (equipped with the trolley wires enabling the trolley traveling) can be avoided since the electric power supplied from the trolley wires is greater than the electric power generated with the engine power.

PRIOR ART LITERATURE

Patent Literature

Patent Literature 1: U.S. Pat. No. 4,483,148

SUMMARY OF THE INVENTION

Problem to be Solved by the Invention

In the trolley-based traveling technology like the one described in the Patent Literature 1, the driver of the vehicle (dump truck) judges whether or not the vehicle has entered a trolley traveling section. When the vehicle has entered a trolley traveling section and the driver viewing the positional relationship between the sliders and the trolley wires judges that the sliders are capable of contacting the trolley wires, the driver operates a switch (e.g., trolley traveling starting button), by which the trolley traveling is started. During the trolley traveling, the driver visually checks the vehicle's displacement with respect to the trolley wires and performs the steering operation so that central positions of the sliders do not deviate widely from the trolley wires in the lateral direction. The timing for ending the trolley traveling is also judged by the driver; the trolley traveling is ended in response to the driver's pressing a button, for example.

Incidentally, to endure a variety of environments, the trolley wires are made of alloy and a length in design (reference length) has been specified for the trolley wires. If the length of the trolley traveling section is the reference length or less, the trolley traveling section can be covered by use of only one trolley wire, and thus the driver is required only to perform the steering operation so as not to deviate from the one trolley wire. However, in cases where the trolley traveling section is longer than the reference length, two or more trolley wires have to be installed in the vehicle's traveling direction in the trolley traveling section. In this case, a linkage section for an already-existing trolley wire (first trolley wire) and a new trolley wire (second trolley wire) occurs. In the linkage section, the terminating end part of the first trolley wire and the beginning end part of the second trolley wire extend in parallel with each other.

In the operation based on the visual check by the driver in cases where such a linkage section is included in the trolley traveling section, the driver is required not only to perform the steering operation so as to simply prevent each slider's central position from widely deviating from the trolley wire in the lateral direction but also to perform the steering operation so that the trolley wire contacting the slider is shifted from the first trolley wire to the second trolley wire. Such steering operation puts a heavy operating load on the driver.

It is therefore the primary object of the present invention to provide an electrically driven dump truck capable of lightening the operating load on the driver during the trolley traveling and realizing stable trolley traveling even when there exists a trolley wire linkage section.

Means for Solving the Problem

To achieve the above object, an invention described in claim 1 provides an electrically driven dump truck which travels on a ground including a first traveling section in which at least one first trolley wire is installed, a second traveling section in which at least one second trolley wire is installed, and a trolley wire linkage section in which a terminating end part of the first trolley wire and a beginning end part of the second trolley wire extend in parallel, by use of electric power received from the first trolley wire and the second trolley wire by elevating a slider of a power collector provided on a vehicle to be movable up and down and making the slider successively contact the first trolley wire and the second trolley wire. The electrically driven dump truck comprises: a trolley wire detecting device which is provided on the vehicle and detects the first trolley wire and the second trolley wire from below when the dump truck is traveling; and a control device which executes the following control based on information detected by the trolley wire detecting device:

giving a yaw moment to the vehicle so that the vehicle travels while tracing the first trolley wire before the vehicle reaches the trolley wire linkage section;

stopping the control to give the yaw moment when the vehicle is traveling in the trolley wire linkage section; and giving a yaw moment to the vehicle so that the vehicle travels while tracing the second trolley wire after the vehicle has passed through the trolley wire linkage section.

In the electrically driven dump truck configured as above, each trolley wire (first trolley wire, second trolley wire) is detected from below with the trolley wire detecting device, and thus there are less factors leading to detection errors compared to conventional techniques detecting lane markers, etc. by capturing images of the ground surface. As a result, the accuracy of the trolley wire detection is improved. Thanks to the improvement of the trolley wire detection accuracy, the control accuracy of the control to give a yaw moment to the vehicle so that the vehicle travels while tracing the first trolley wire and the second trolley wire is improved and the central position of the slider of the traveling vehicle hardly deviates widely from the trolley wire in the lateral direction. Consequently, the operating load on the driver during the trolley traveling can be lightened considerably. Further, along with the tracing of the trolley wire (first trolley wire), whether the vehicle is traveling in the trolley wire linkage section or not is detected. In the trolley wire linkage section, the control is performed not to execute the yaw moment control. With this control, the vehicle is prevented from continuing tracing the first trolley wires and traveling toward the lane edge. After the vehicle has passed through the trolley wire linkage section, the yaw moment control for tracing the trolley wire (second trolley wire) is executed again. Therefore, the trolley wire contacting the slider is shifted from the first trolley wire to the second trolley wire without the need of careful steering operation by the driver. Consequently, trolley wire tracing control in trolley traveling lanes longer than the reference length of one trolley wire becomes possible.

In an invention described in claim 2, in the electrically driven dump truck according to claim 1, when the trolley wire detecting device has detected the first trolley wire, the control device calculates at least one representative point of the vehicle and at least one target point situated on the first trolley wire based on the information detected by the trolley wire detecting device and executes control to give a yaw moment to the vehicle so that the representative point approaches the target point. When the trolley wire detecting device has detected the second trolley wire, the control device calculates at least one representative point of the vehicle and at least one target point situated on the second trolley wire based on the information detected by the trolley wire detecting device and executes control to give a yaw moment to the vehicle so that the representative point approaches the target point.

This control allows the vehicle to travel while tracing the trolley wire when the vehicle is traveling outside the trolley wire linkage section.

In an invention described in claim 3, in the electrically driven dump truck according to claim 1 or 2, the first trolley wire includes two trolley wires: a third trolley wire and a fourth trolley wire. The second trolley wire includes two trolley wires: a fifth trolley wire and a sixth trolley wire. The trolley wire linkage section includes a first trolley wire linkage section in which a terminating end part of the third trolley wire and a beginning end part of the fifth trolley wire extend in parallel and a second trolley wire linkage section in which a terminating end part of the fourth trolley wire and a beginning end part of the sixth trolley wire extend in parallel at a position different from the first trolley wire linkage section. The control device executes the following control based on the information detected by the trolley wire detecting device:

giving a yaw moment to the vehicle so that the vehicle travels while tracing the third trolley wire before the vehicle reaches the first trolley wire linkage section;

stopping the control to give the yaw moment according to the third trolley wire and switching to control to give a yaw moment to the vehicle so that the vehicle travels while tracing the fourth trolley wire when the vehicle has reached the first trolley wire linkage section; and stopping the control to give the yaw moment according to the fourth trolley wire and switching to control to give a yaw moment to the vehicle so that the vehicle travels while tracing the fifth trolley wire when the vehicle has reached the second trolley wire linkage section.

According to this control, in the first trolley wire linkage section, the control for tracing the third trolley wire is stopped and the yaw moment control is performed so as to trace the fourth trolley wire as a straight section. This allows the vehicle to carry out stable trolley traveling without tracing the deviating third trolley wire. In the second trolley wire linkage section, the control for tracing the fourth trolley wire is stopped and the yaw moment control is performed so as to trace the fifth trolley wire. This makes it possible to control the vehicle so as to have the vehicle trace the fifth trolley wire without tracing the deviating fourth trolley wire. Consequently, stable trolley traveling becomes possible even in cases where the linkage sections of the right and left trolley wires are not at the same position.

In an invention described in claim 4, in the electrically driven dump truck according to any one of claims 1-3, the control device judges that the vehicle is traveling in the trolley wire linkage section when the second trolley wire is detected by the trolley wire detecting device.

This makes it possible to detect whether the vehicle is traveling in the trolley wire linkage section or not with high accuracy, by which the yaw moment control according to the present invention is more stabilized.

In an invention described in claim 5, the electrically driven dump truck according to any one of claims 1-4 further comprises right and left electric motors for traveling. The control device executes both the control to give a yaw moment to the vehicle and traveling speed control by controlling the right and left electric motors.

With this configuration, efficient control, achieving both the deceleration and the generation of the yaw moment at the same time, can be carried out by the control of the electric motors.

In an invention described in claim 6, the electrically driven dump truck according to any one of claims 1-5 further comprises right and left electric motors for traveling and a steering device. The control device includes a vehicle control device, a controller, an inverter control device and a steering control device. The vehicle control device calculates a yaw moment correction value, for the control to give a yaw moment to the vehicle so that the vehicle travels while tracing the first and second trolley wires, based on the information detected by the trolley wire detecting device. The controller controls at least the right and left electric motors or the steering device by using the inverter control device and/or the steering control device based on the yaw moment correction value.

By executing the yaw moment control by using the vehicle control device and the controller as separate components as described above, even when the controller is an already-existing controller, the control in accordance with the present invention can be carried out by just adding the vehicle control device to the controller. The parameters of the yaw moment control can be adjusted just by changing the functions of the vehicle control device. Consequently, high flexibility can be given to the control system.

In an invention described in claim 7, in the electrically driven dump truck according to any one of claims 1-6, the trolley wire detecting device includes: a camera which is provided on the vehicle and continuously captures images of the first and second trolley wires when the dump truck is traveling; and an illuminating device which is provided on the vehicle and illuminates the first and second trolley wires.

Even when a camera is employed for the trolley wire detecting device as above, illuminating the trolley wire with the illuminating device keeps high contrast between the sky and the trolley wire. Consequently, the yaw moment control can be executed with high accuracy not only in the daytime with fine weather but also in conditions in which such high contrast between the sky and the trolley wire is hardly achieved (evening, nighttime, rainy weather, etc.).

Effect of the Invention

According to the present invention, the control accuracy of the control to give a yaw moment to the vehicle so that the vehicle travels while tracing the trolley wire is improved and the central position of the slider of the traveling vehicle hardly deviates widely from the trolley wire in the lateral direction. Consequently, the operating load on the driver during the trolley traveling can be lightened considerably. Further, since the trolley wire contacting the slider is shifted from the first trolley wire to the second trolley wire without the need of careful steering operation by the driver, stable trolley wire tracing control becomes possible even in trolley traveling lanes longer than the reference length of one trolley wire.

MODE FOR CARRYING OUT THE INVENTION

Figure 1:
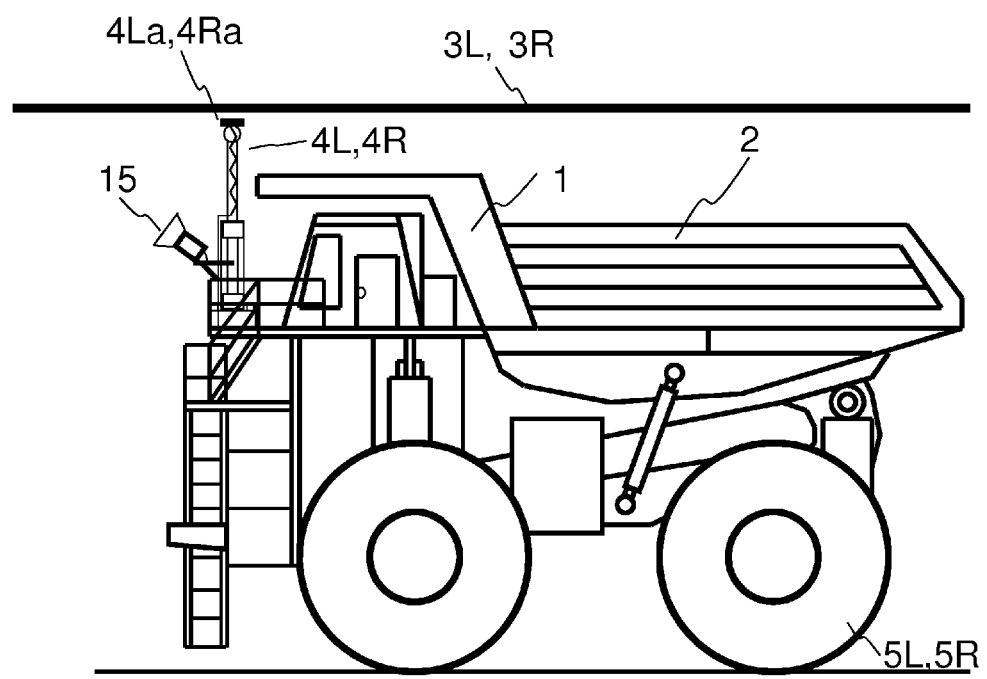
FIG. 1 is a side view showing the external appearance of an electrically driven dump truck in accordance with a first embodiment of the present invention.

Referring now to the drawings, a description will be given in detail of preferred embodiments in accordance with the present invention.
<Configuration of Vehicle—Dump Truck>

FIG. 1 is a side view showing the external appearance of an electrically driven dump truck in accordance with an embodiment of the present invention.

In FIG. 1, the dump truck comprises a vehicle 1, a vessel 2 for carrying earth, sand, etc., right and left power collectors 4R and 4L for collecting electric power, and right and left rear wheels (tires) 5R and 5L driven by the electric power collected by the power collectors 4R and 4L. The right and left power collectors 4R and 4L are equipped with sliders 4Ra and 4La which are movable up and down to receive the electric power from two (right and left) trolley wires 3R and 3L. One of the trolley wires 3R and 3L is at a high voltage and the other is grounded. In the following explanation, first trolley wires $3R_1$ and $3L_1$ and second trolley wires $3R_2$ and $3L_2$ can be collectively described as "trolley wires 3R and 3L" as needed for the sake of convenience. The power collectors 4R and 4L are provided on a front part of the vehicle 1. The dump truck is equipped with a trolley wire detecting device 15 mounted on the front part of the vehicle 1. The trolley wire detecting device 15 continuously detects the trolley wires 3R and 3L in front of the dump truck when the dump truck is traveling. The trolley wire detecting device 15 is a device newly mounted on the dump truck according to the present invention. While the trolley wire detecting device 15 is mounted on the front part of the vehicle 1 in the illustrated example, the trolley wire detecting device 15 may also be arranged differently (e.g., on the roof of the vehicle 1).

Figure 2:
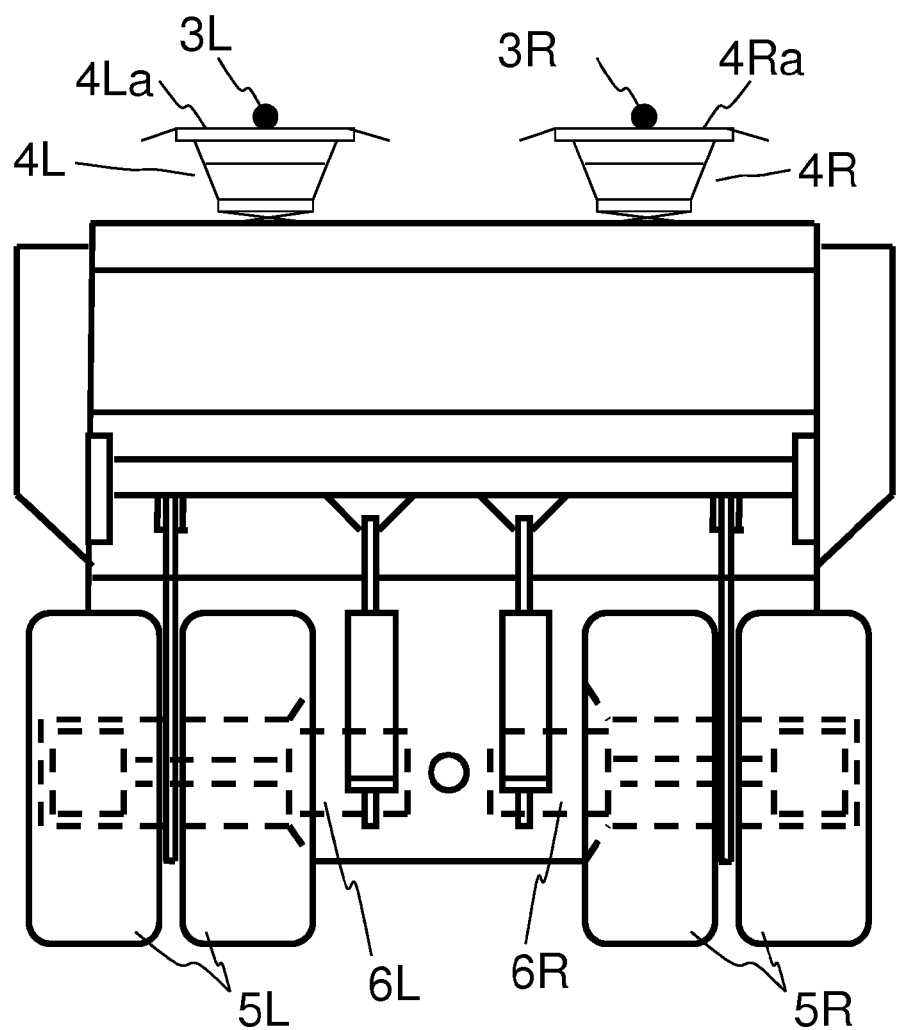
FIG. 2 is a rear view showing the external appearance of the dump truck.

FIG. 2 is a rear view showing the external appearance of the dump truck. Each rear wheel 5R, 5L is formed as a double-tire wheel to endure the load of earth, sand, etc. loaded on the vessel 2. The right and left double-tire wheels 5R and 5L are driven and braked by right and left electric motors 6R and 6L (e.g., induction motors).

Figure 3:
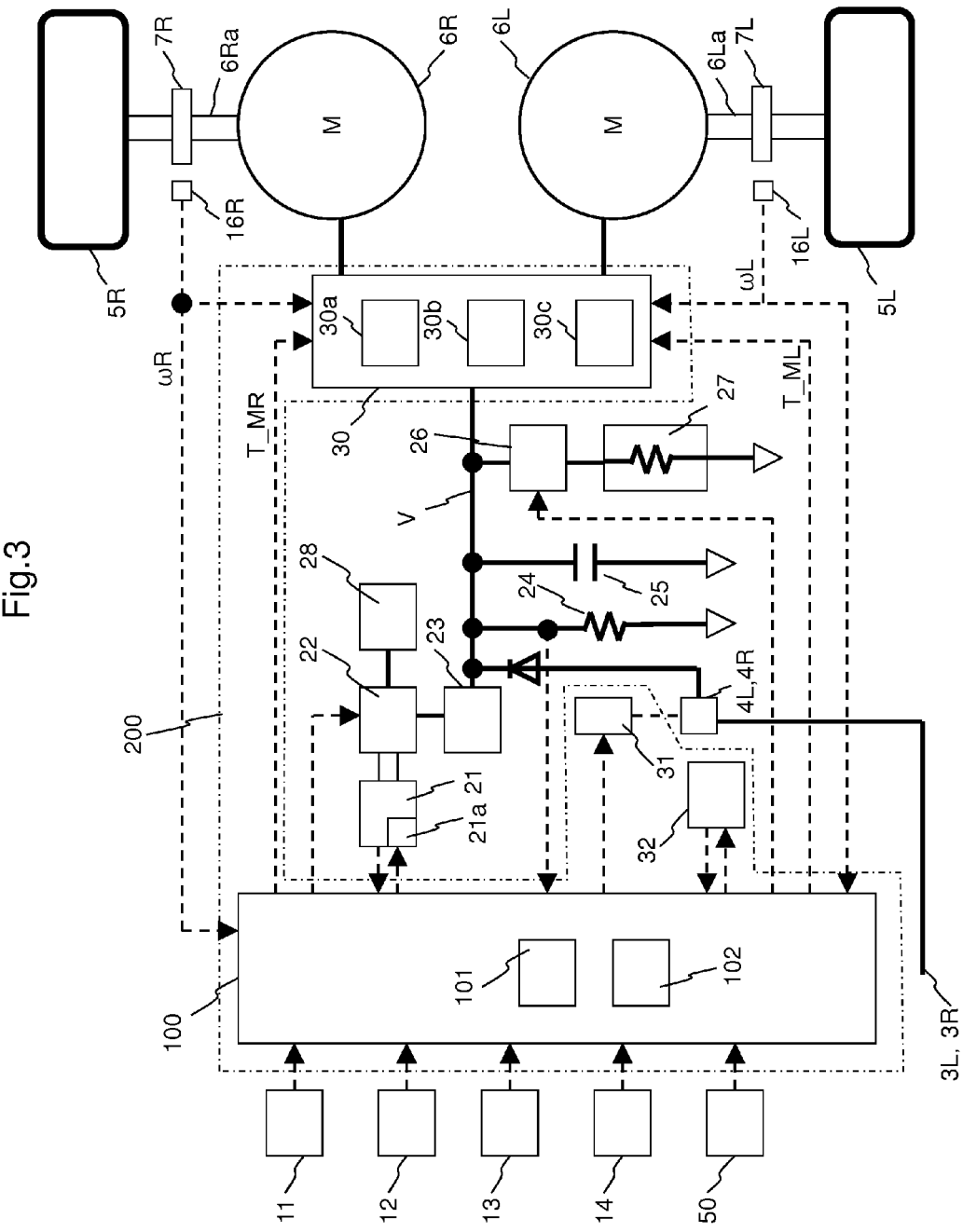
FIG. 3 is a schematic block diagram showing a drive system of the electrically driven dump truck in this embodiment.

FIG. 3 shows a drive system of the electrically driven dump truck of this embodiment.

In FIG. 3, the drive system of the electrically driven dump truck includes an accelerator pedal 11, a retarder pedal 12, a shift lever 13, a combined sensor 14, an engine 21, an AC generator 22, the other engine load 28, a rectifier circuit 23, a sensing resistor 24, a capacitor 25, a chopper circuit 26, a grid resistor 27, the power collectors 4R and 4L, the rear wheels 5R and 5L, the electric motors 6R and 6L, decelerators 7R and 7L, electromagnetic pickup sensors 16R and 16L, and a control device 200. The combined sensor 14 is used for sensing the forward/backward acceleration, the lateral acceleration and the yaw rate. The decelerators 7R and 7L are connected to output shafts 6Ra and 6La of the electric motors 6R and 6L, respectively.

The control device 200 includes an inverter control device 30, an elevation control device 31, a steering control device 32, a vehicle control device 50 and a controller 100. The inverter control device 30 controls the electric motors 6R and 6L according to torque commands inputted thereto. The elevation control device 31 moves the sliders 4Ra and 4La of the power collectors 4R and 4L up and down according to button operations by the driver or inputs from the outside. The steering control device 32 converts the driver's steering operation into an electric signal and thereby controls the steering of the front wheels. The vehicle control device 50 is a characteristic part of the present invention.

The inverter control device 30 includes a torque command calculation unit 30a, a motor control calculation unit 30b and an inverter (switching element) 30c (publicly-known configuration) for each of the right and left electric motors 6R and 6L. The power collectors 4R and 4L are equipped with elevators which move the sliders 4Ra and 4La up and down according to elevation command signals from the elevation control device 31. The details of the power collectors 4R and 4L, the elevation control device 31, the steering system (including the steering control device 32) and the vehicle control device 50 will be described later.

<Basic Operation Including Traveling>

The depressing level P (the degree of depressing) of the accelerator pedal 11 and the depressing level Q of the retarder pedal 12 are inputted to the controller 100 as signals for controlling the magnitude of the driving force and the retarding force (braking force), respectively. For example, when the driver depresses the accelerator pedal 11 to move the dump truck forward or backward, the controller 100 outputs a command regarding a target revolution speed Nr to the engine 21. The command regarding the target revolution speed Nr is outputted based on a preset table of target revolution speeds Nr corresponding to various accelerator angles. The engine 21 is a diesel engine equipped with an electronic governor 21a. Upon receiving the command regarding the target revolution speed Nr, the electronic governor 21a controls the fuel injection quantity so that the engine 21 revolves at the target revolution speed Nr.

The AC generator 22 is connected to the engine 21 to generate AC power. The electric power generated by the AC power generation is rectified by the rectifier circuit 23 and stored in the capacitor 25 (DC voltage: V). A voltage value detected by the sensing resistor 24 (dividing the DC voltage V at a certain ratio) is fed back to the controller 100. The AC generator 22 is controlled by the controller 100 receiving the feedback so that the voltage value equals a prescribed constant voltage V0.

The electric power generated by the AC generator 22 is supplied to the right and left electric motors 6R and 6L via the inverter control device 30. The controller 100 controls the supply of the necessary electric power to the electric motors 6R and 6L by controlling the AC generator 22 so that the DC voltage V acquired by the rectification by the rectifier circuit 23 equals the prescribed constant voltage V0. In contrast, when the sliders 4Ra and 4La of the power collectors 4R and 4L are in contact with the trolley wires 3R and 3L, the DC voltage V0 is directly supplied from the trolley wires 3R and 3L to the inverter control device 30.

The controller 100 calculates torque command values T_MR_a and T_ML_a corresponding to the operation amounts of the accelerator pedal 11 and the retarder pedal 12 and then generates and outputs torque command values T_MR and T_ML for the right and left electric motors 6R and 6L based on the torque command values T_MR_a and T_ML_a, torque correction values T_MR_V and T_ML_V for vehicle speed control, and motor torque correction values T_MR_Y and T_ML_Y for yaw moment control (explained later). The torque command values T_MR and T_ML for the right and left electric motors 6R and 6L and the revolution speeds ωR and ωL of the electric motors 6R and 6L detected by the electromagnetic pickups 16R and 16L are inputted to the inverter control device 30. The inverter control device 30 drives each of the electric motors 6R and 6L via the torque command calculation unit 30a, the motor control calculation unit 30b and the inverter (switching element) 30c.

The right and left rear wheels (tires) 5R and 5L are connected to the electric motors 6R and 6L via the decelerators 7R and 7L, respectively. Each electromagnetic pickup 16R, 16L is generally implemented by a sensor which detects the peripheral speed of a cog of a gear inside the decelerator 7R, 7L. In the drive system for the right-hand side, for example, it is also possible to attach a gear for the detection to a drive shaft inside the electric motor 6R or to a drive shaft connecting the decelerator 7R to the wheel (tire) 5R and arrange the electromagnetic pickup 16R at the position of the gear.

When the driver of the traveling dump truck returns the accelerator pedal 11 and depresses the retarder pedal 12, the controller 100 executes control so that the AC generator 22 does not generate electric power. Further, the torque command values T_MR_a and T_ML_a from the controller 100 turn negative and thus the inverter control device 30 drives the electric motors 6R and 6L to give braking force to the traveling dump truck. In this case, the electric motors 6R and 6L function as generators so as to electrically charge the capacitor 25 by use of the rectification function of the inverter control device 30. The chopper circuit 26 operates to keep the DC voltage value V within a preset DC voltage value V1 while converting electric energy to thermal energy by feeding electric current to the grid resistor 27.

<Upward/Downward Movement of Sliders of Power Collectors>

Figure 4:
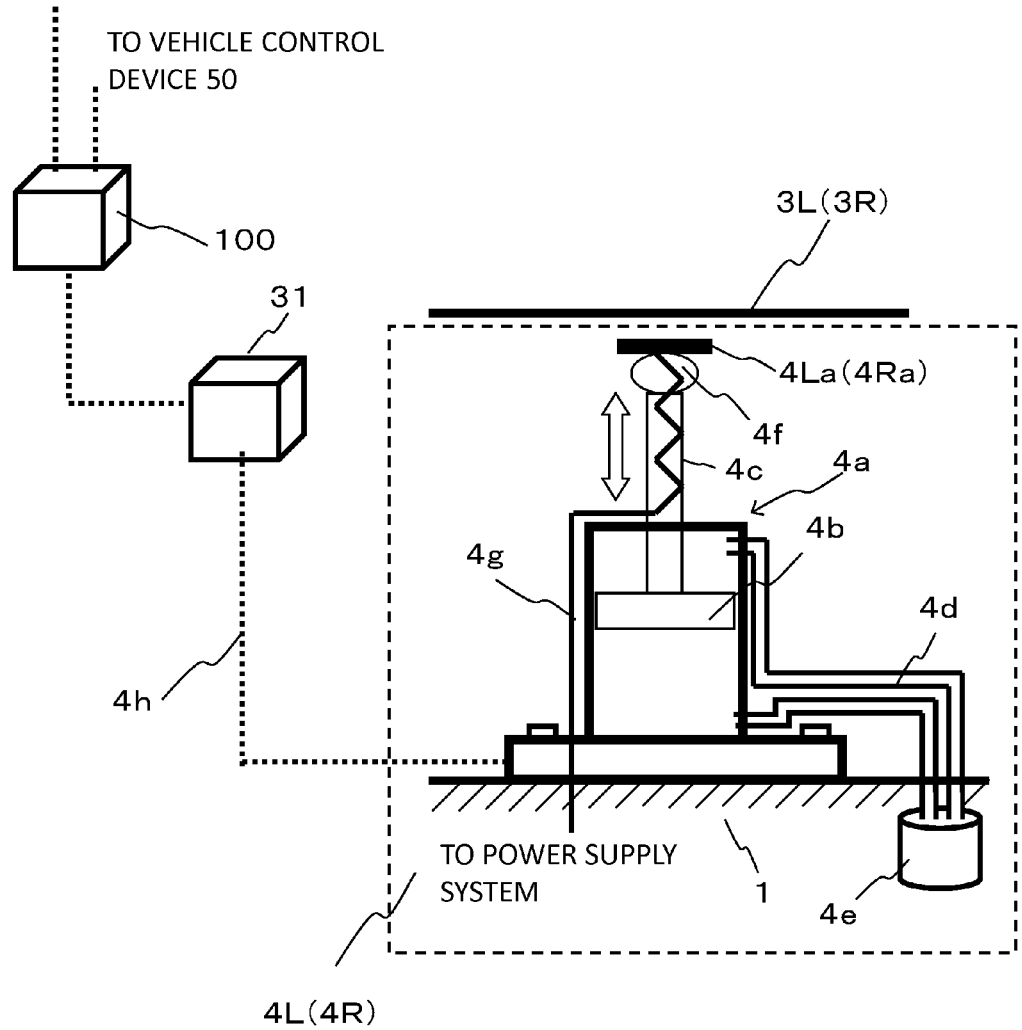
FIG. 4 is a schematic diagram showing the configuration of power collectors for receiving electric power from trolley wires.

Next, the elevators for the sliders 4Ra and 4La of the power collectors 4R and 4L will be explained below. FIG. 4 shows the configuration of the power collectors 4R and 4L for receiving the electric power from the trolley wires 3R and 3L. Since the power collectors 4R and 4L are identical with each other in the configuration, the configuration of the power collector 4L will be explained as a representative. The power collector 4L has a hydraulic piston device 4a as the elevator. The housing of the hydraulic piston device 4a is fixed on the vehicle 1. The slider 4La is attached to an end of a rod 4c of a hydraulic piston 4b of the hydraulic piston device 4a. The contact/detachment of the slider 4La to/from the trolley wire 3L is controlled by vertically moving the hydraulic piston 4b with hydraulic fluid supplied from a hydraulic device 4e (including a hydraulic pump) via a hydraulic line 4d. The slider 4La and the rod 4c of the hydraulic piston 4b are electrically insulated from each other by an insulator 4f. The electric power of the trolley wire 3L is supplied to a power supply system of the inverter control device 30 (for driving the motors, see FIG. 3) via the slider 4La and an electric wire 4g. The elevation control device 31 is configured to send the elevation command signal 4h to the hydraulic device 4e according to the driver's operation on an elevation switch or a switching (flag) operation or a control command signal from the outside (e.g., the vehicle control device 50 of the present invention). While the elevator for the slider 4La is implemented by the hydraulic piston device 4a in this embodiment, the elevator may of course be implemented by the system called "pantograph" by use of parallel linkage, spring, motor, etc. as is generally employed for electric trains.

<Steering System>

Figure 5:
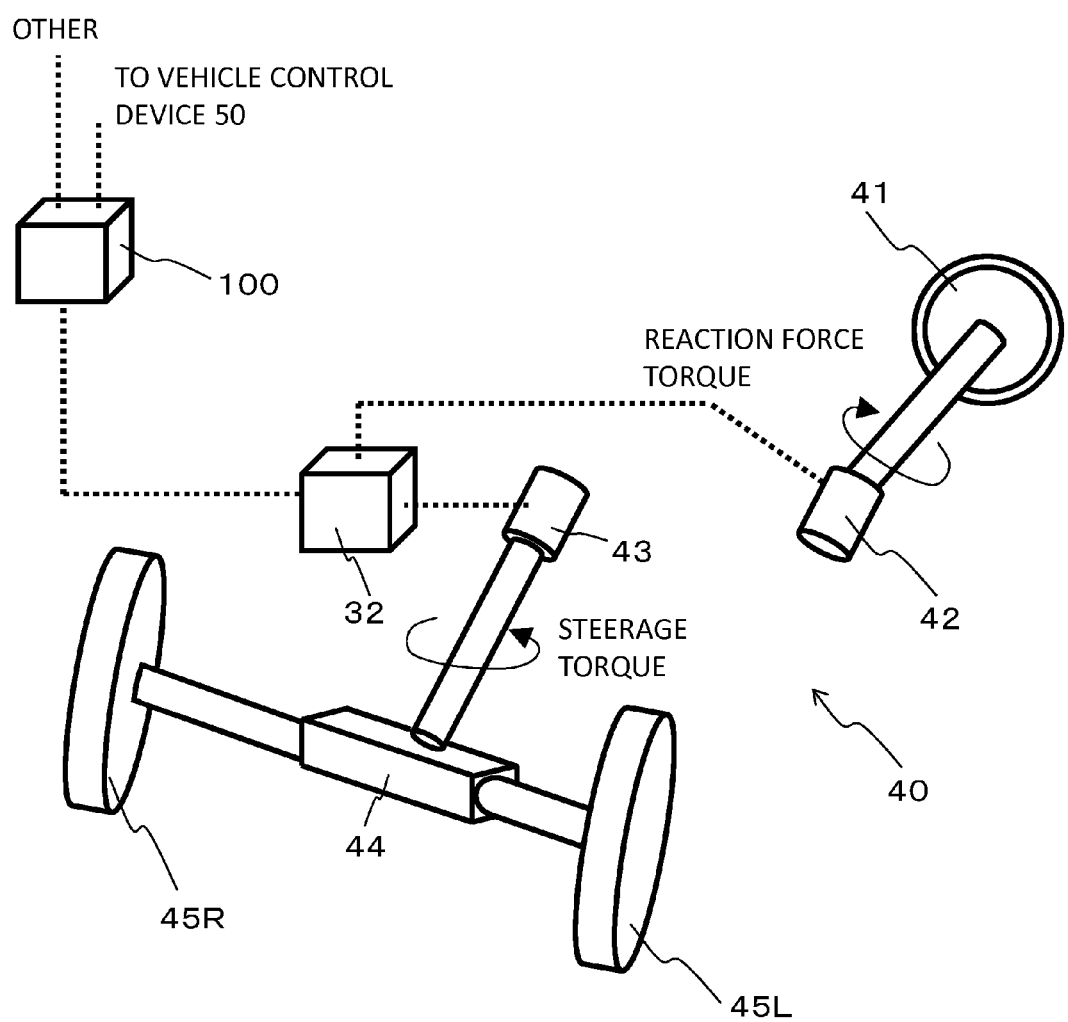
FIG. 5 is a schematic diagram showing a steering system which is made up of a steering control device and a steering device.

Next, the steering system will be explained below by referring to FIG. 5.

The steering system is made up of the aforementioned steering control device 32 and a steering device 40. The steering device 40 includes a steering wheel 41, a reaction force motor 42 having a steering angle sensor, a steerage motor 43 having a steerage angle sensor, and a rack-and-pinion gear 44.

When the driver operates the steering wheel 41, the steering angle sensor of the reaction force motor 42 detects the operation amount of the steering wheel 41 and sends the detected operation amount to the steering control device 32. The steering control device 32 sends a torque signal to the steerage motor 43 having the steerage angle sensor so that the present steerage angle equals a steerage angle corresponding to the steering angle of the driver. Front wheels 45R and 45L are turned (steerage) by steerage torque which is generated by the steerage motor 43 and transmitted via the rack-and-pinion gear 44. Depending on the magnitude of this torque, reaction force torque is transmitted to the reaction force motor 42 having the steering angle sensor, by which reaction force is transmitted to the steering wheel 41. At the same time, the steering control device 32 sends the steering angle to the controller 100. The steering control device 32 has a function of receiving a steerage torque correction value from the controller 100 and operating the steerage motor 43 (having the steerage angle sensor) according to the received steerage torque correction value. Whether the steering control device 32 similarly sends the reaction force to the reaction force motor 42 having the steering angle sensor or not can be changed properly based on the mode (explained later) at that time and a command from the controller 100. For example, if the steering control device 32 receiving the steerage torque correction value from the controller 100 operates the steerage motor 43 having the steerage angle sensor according to the correction value without sending the reaction force command value to the reaction force motor 42 having the steering angle sensor, the driver loses the steering feeling at that moment even though the vehicle (dump truck) turns according to the steering angle. In contrast, if no command is sent to the steerage motor 43 having the steerage angle sensor even with the steering operation by the driver, the vehicle (dump truck) does not turn in spite of the turning of the steering wheel 41. This means is effective when the controller 100 judges that the steering wheel 41 should not be operated for some reason, for example. As means for informing the driver that the steering wheel 41 should not be operated at the moment, the steering control device 32 may generate torque in a direction opposite to the direction of the driver's steering operation. The torque makes the driver feel that the steering wheel 41 is heavy and recognize that the steering wheel 41 should not be operated in the direction.

While the steer-by-wire system in which the steering wheel 41 is not directly linked to the front wheels 45R and 45L has been explained in this embodiment, the steering system is not limited thereto. For example, an electric power steering system in which the reaction force motor 42 having the steering angle sensor and the steerage motor 43 having the steerage angle sensor are directly connected together as an integral component may also be employed. Further, the steerage motor 43 having the steerage angle sensor may also be implemented by a motor of the hydraulic servo type. Furthermore, the correction value sent from the controller 100 may also be a corrected angle instead of the torque. In this case, the steering control device 32 may be configured to perform torque feedback control so as to eliminate the deviation between the angle detected by the steerage angle sensor and the corrected angle.

Figure 6:
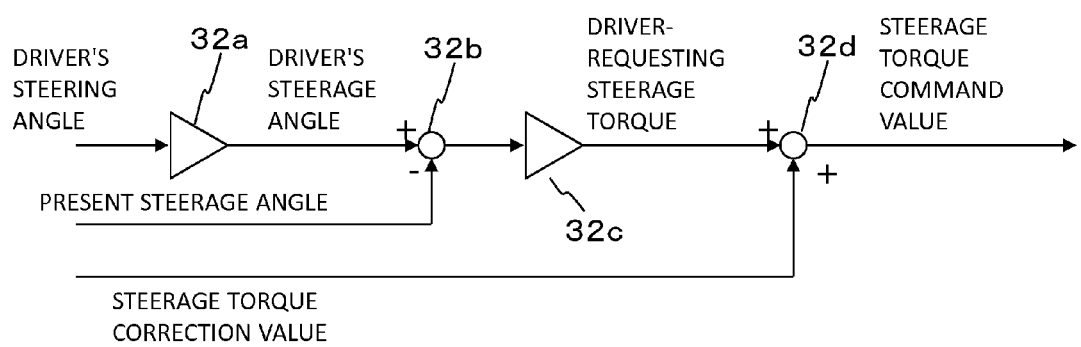
FIG. 6 is a block diagram showing a function of the steering control device for calculating a steerage torque command value.

FIG. 6 is a block diagram showing a function of the steering control device 32 for calculating a steerage torque command value. A conversion unit 32a of the steering control device 32 converts the driver's steering angle received from the reaction force motor 42 having the steering angle sensor into a driver steerage angle by multiplying the driver's steering angle by a gain factor. A calculation unit 32b subtracts the present steerage angle from the driver steerage angle. A conversion unit 32c converts the subtraction result into driver-requesting steerage torque by multiplying the subtraction result by a gain factor. Then, a calculation unit 32d calculates the steerage torque command value by adding the steerage torque correction value (received from the controller 100) to the driver-requesting steerage torque. The calculated steerage torque command value is outputted to the steerage motor 43 having the steerage angle sensor.

<Vehicle Speed Control>

Figure 7:
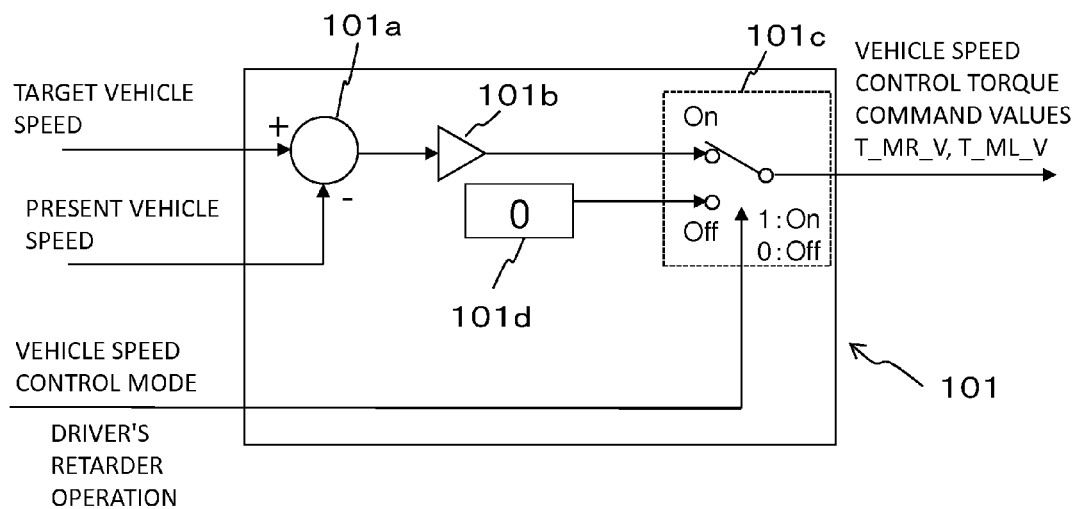
FIG. 7 is a block diagram for explaining a function of a vehicle speed control unit of a controller.

Referring again to FIG. 3, the controller 100 includes a vehicle speed control unit 101. When a vehicle speed control mode has been selected (ON), the vehicle speed control unit 101 implements the control of the vehicle speed according to the vehicle speed control mode, by executing feedback control to the present vehicle speed with respect to a target vehicle speed that is set in the vehicle speed control mode. FIG. 7 is a block diagram for explaining the function of the vehicle speed control unit 101. As shown in FIG. 7, when the vehicle speed control mode is ON (1), that is, when a switch unit 101c is at its ON position, the vehicle speed control unit 101 receiving the target vehicle speed and the present vehicle speed calculates the difference between the two vehicle speeds with a calculation unit 101a, calculates the torque correction values T_MR_V and T_ML_V (for changing the present vehicle speed to the target vehicle speed) with a conversion unit 101*b* by multiplying the difference by a gain factor, and outputs the calculated torque correction values T_MR_V and T_ML_V. The vehicle speed control unit 101 receives revolution speeds ωR and ωL of the electric motors 6R and 6L detected by the electromagnetic pickups 16R and 16L and calculates the vehicle speed from the revolution speeds. Thus, a vehicle speed detecting device is formed by the vehicle speed control unit 101 and the electromagnetic pickups 16R and 16L. A command specifying whether or not to shift to the vehicle speed control mode may be issued according to the driver's operation on a switch of the vehicle control device 50 or according to an input from the outside, for example. The cancellation of the vehicle speed control mode may be made according to the driver's depressing the retarder pedal 12 or according to an input from the outside. When the vehicle speed control mode is canceled, the command of the vehicle speed control mode is turned OFF (0) (i.e., the switch unit 101*c* is turned OFF) and a vehicle control torque command value 0 is outputted by a zero output unit 101*d*. The controller 100, having a preset table of engine revolution speed command values corresponding to various torque correction values T_MR_V and T_ML_V, outputs an engine revolution speed command value to the engine 21 based on the table.

<Yaw Moment Control>

Figure 8:
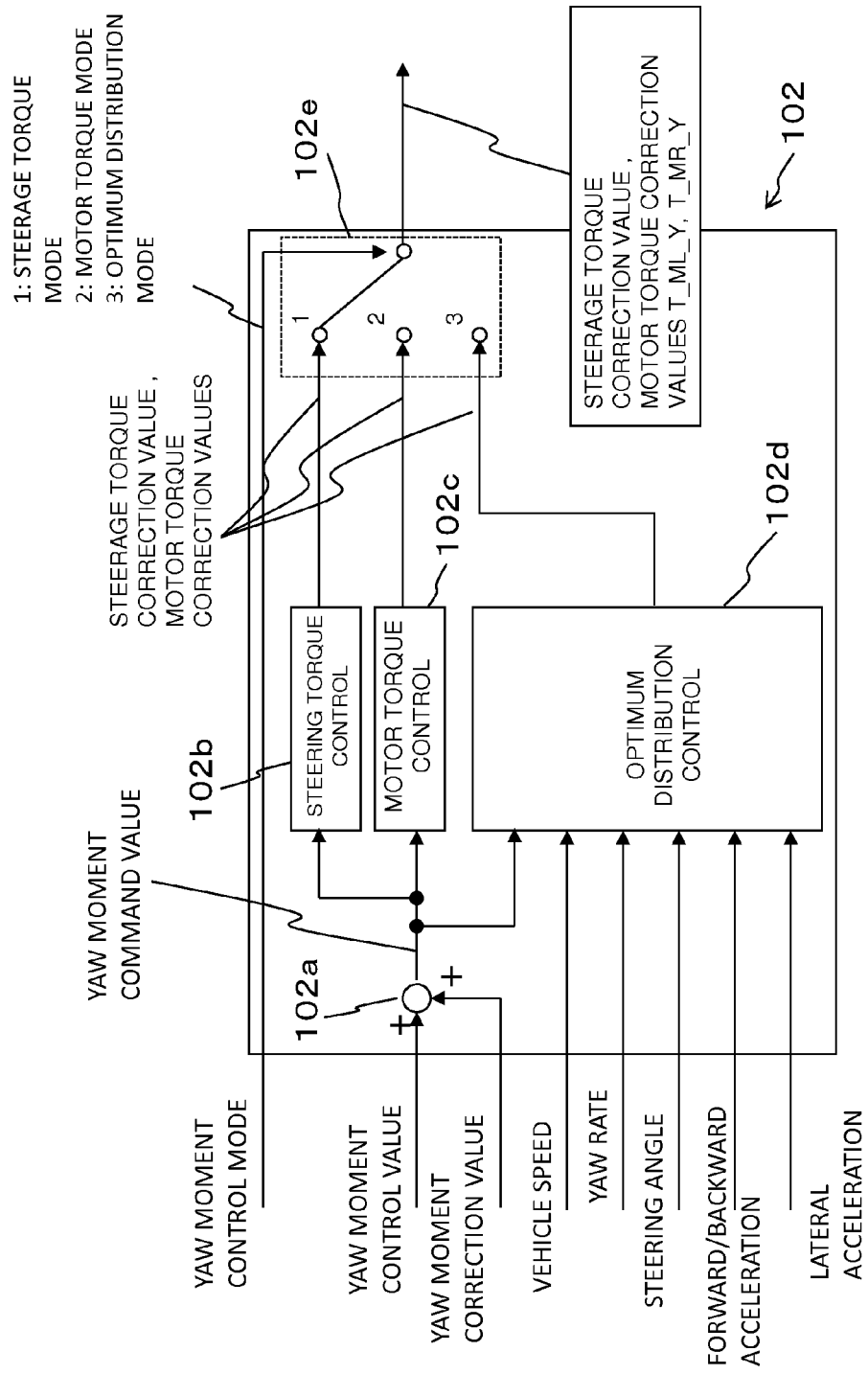
FIG. 8 is a block diagram showing the details of a function of a yaw moment control unit of the controller.

As shown in FIG. 3, the controller 100 further includes a yaw moment control unit 102 for controlling the turning direction of the vehicle. FIG. 8 is a block diagram showing the details of the function of the yaw moment control unit 102. As shown in FIG. 8, input signals to the yaw moment control unit 102 include, for example, a yaw moment control value which is generated by other yaw moment control (e.g., sideslip prevention control), a yaw moment correction value which is generated according to the present invention, the vehicle speed, the forward/backward acceleration, the lateral acceleration, the yaw rate, the steering angle, and a command of a yaw moment control mode. Output signals from the yaw moment control unit 102 are the steerage torque correction value and the torque correction values T_MR_Y and T_ML_Y for the motors. The yaw moment control value and the yaw moment correction value are added together by a calculation unit 102*a* to determine a yaw moment command value. The yaw moment command value is inputted to a steering torque control unit 102*b*, a motor torque control unit 102*c* and an optimum distribution control unit 102*d*. The steering torque control unit 102*b* calculates a steerage torque correction value based on the inputted yaw moment command value. The motor torque control unit 102*c* calculates motor torque correction values based on the inputted yaw moment command value. The optimum distribution control unit 102*d* calculates a yaw moment distribution ratio based on the yaw moment command value, the vehicle speed, the yaw rate, the steering angle, the forward/backward acceleration and the lateral acceleration inputted thereto and then calculates a steerage torque correction value and motor torque correction values corresponding to the yaw moment distribution ratio. The command of the yaw moment control mode is inputted to a switch unit 102*e*. When the yaw moment control mode is mode 1, the switch unit 102*e* outputs the steerage torque correction value calculated by the steering torque control unit 102*b*. When the yaw moment control mode is mode 2, the switch unit 102*e* outputs the motor torque correction value calculated by the motor torque control unit 102*c*. When the yaw moment control mode is mode 3, the switch unit 102*e* outputs the steerage torque correction value and the torque correction values for the right and left motors calculated by the optimum distribution control unit 102*d*.

<Setting of Yaw Moment Control Mode>

In mines where the dump trucks are traveling, there is an increasing request for the reduction of the time necessary for transporting earth, sand, etc. This is because the reduction of the necessary time shortens the earth/sand transportation cycle of each dump truck and increases the number of times of transportation. The vehicle speed is the major factor directly contributing to the reduction of the necessary time. Therefore, it is desirable to avoid control that causes a decrease in the vehicle speed.

Figure 9:
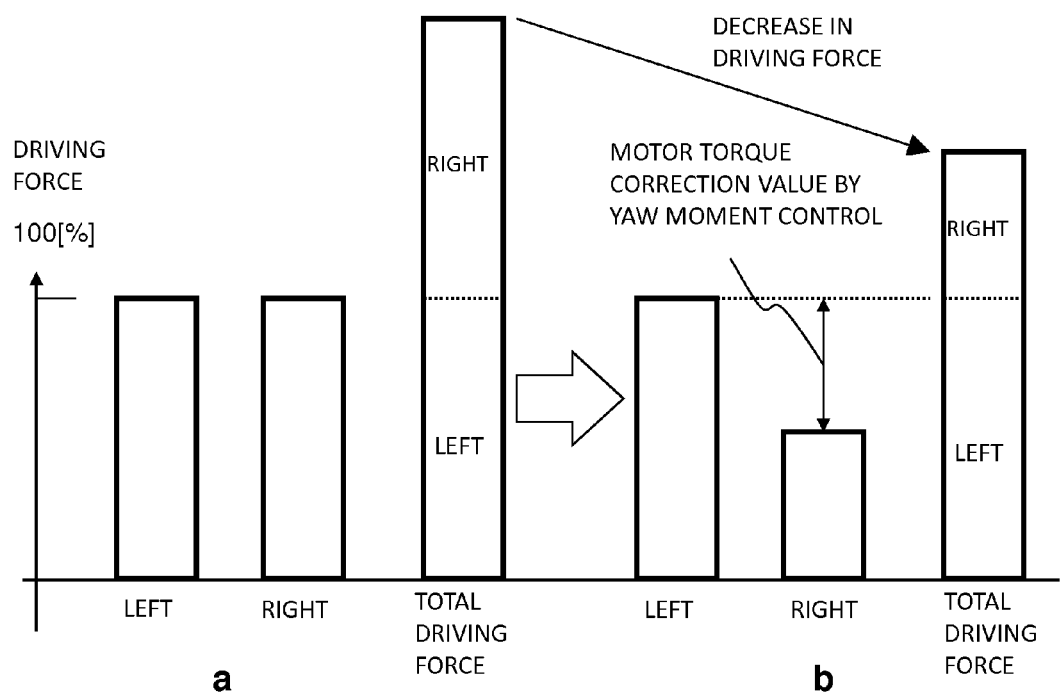
FIG. 9 is a graph showing the effect of a method implementing a yaw moment correction value by a driving force difference on the total driving force of the motors when the vehicle is traveling with its 100% motor driving force.

FIG. 9 is a graph showing the effect of a method implementing the yaw moment correction value by a driving force difference on the total driving force of the motors when the vehicle is traveling with its 100% motor driving force. For example, assuming that the vehicle is currently traveling at a constant speed with its 100% driving force as shown on the left side "a" of FIG. 9, the total driving force of the vehicle is in balance with the traveling resistance (air resistance, frictional resistance, slope angle, etc.). In the configuration of this embodiment, the "100% driving force" means the output limits of the rear wheel motors, that is, the maximum value of the driving force that the motors can output at that speed. Let us consider here the method of generating the yaw moment by giving driving/braking force to the vehicle. In this case, the generation of the yaw moment can only be achieved by decreasing the driving force of one of the right and left motors as shown on the right side "b" of FIG. 9 since the motors are already at their output limits as mentioned above. While a yaw moment corresponding to the decrease in the driving force is generated in the vehicle, the vehicle speed drops due to the decrease in the driving force. This goes against the aforementioned request for the time reduction. Therefore, the actuator that should generate the yaw moment in this case is desired to operate in a way not causing a considerable speed drop. Thus, setting the yaw moment control mode to the mode 1 as shown in FIG. 8 is appropriate in this case. In contrast, when the driving force of the vehicle is below 100%, the yaw moment control mode is switched to the motor torque control (yaw moment control mode 2) or the optimum distribution control (yaw moment control mode 3) depending on the magnitude of the driving force and other vehicle state quantities.

<Combining of Motor Torque Generated by Each Unit>

Figure 10:
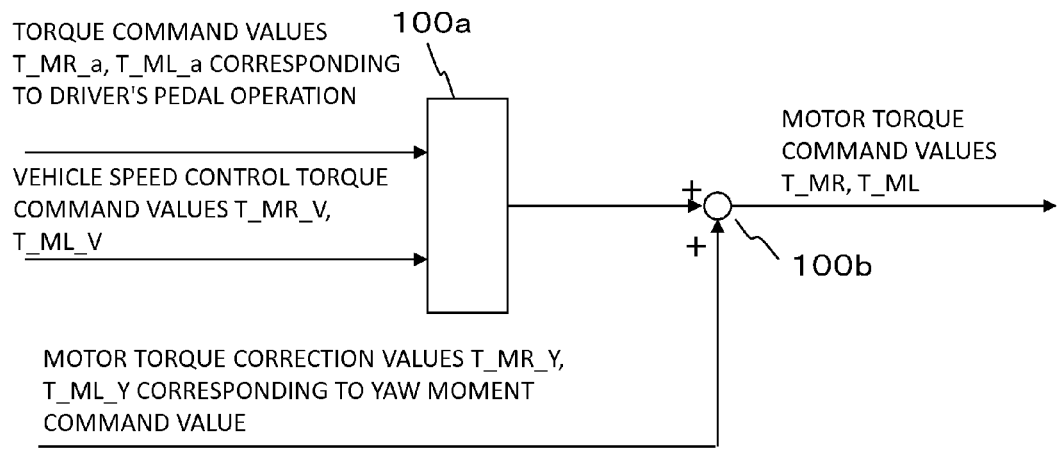
FIG. 10 is a schematic diagram showing an example of a method for calculating motor torque command values.

A method for the calculation of the motor torque command values by the controller 100 will be explained referring to FIG. 10. FIG. 10 is a schematic diagram showing an example of the method for calculating the motor torque command values. First, a processing unit 100*a* selects the aforementioned torque command values T_MR_a and T_ML_a corresponding to the driver's operation on the accelerator/retarder pedals or the torque command values T_MR_V and T_ML_V generated by the vehicle speed control. For example, the processing unit 100*a* selects the driver's torque command when it exists. Otherwise, the processing unit 100*a* selects the torque command for the vehicle speed control. Thereafter, a calculation unit 100*b* calculates motor torque command values T_MR and T_ML by adding the motor torque correction values T_MR_Y and T_ML_Y corresponding to the yaw moment command value generated by the yaw moment control unit 102 respectively to the torque command values selected by the processing unit 100*a*. This motor torque combining method is just an example; various other methods (e.g. publicly-known methods) may be used.

<Overall Configuration of Characteristic Part>

Next, the overall configuration of the characteristic part of the electrically driven dump truck in accordance with this embodiment will be explained below referring to FIG. 11.

As mentioned above, the drive system of the electrically driven dump truck of this embodiment includes the trolley wire detecting device 15 for detecting the trolley wires 3R and 3L and the vehicle control device 50.

The trolley wire detecting device 15 can be implemented typically by a sensor such as a laser radar, a millimeter wave radar or a camera. In an X-Y plane formed by an X-axis representing the traveling direction of the vehicle (direction of the vehicle axis) and a Y-axis representing the lateral direction (perpendicular to the vehicle axis) of the vehicle, any one of the above sensors serves in the present invention as means for detecting the relative positional relationship between the vehicle and the trolley wires. In the case of the laser radar, scanning (searching for the trolley wires) in the X-axis direction of the vehicle is effective for precisely detecting the trolley wires. In the case of the millimeter wave radar, ill effect of the weather (fog, rain, etc.) is lighter in comparison with other types of sensors. These radar sensors are capable of detection not only in the XY directions but also in the Z direction (height direction of the vehicle and the trolley wires). Therefore, the radar sensors can be suitable in cases where the system of the present invention is used together with a system needing the detection in the height direction.

In the case of the camera, images of the trolley wires are shot from below, and thus the trolley wires can be detected precisely in the daytime with fine weather thanks to high contrast between the sky and the trolley wires. It is also possible to equip the vehicle 1 with an illuminating device 51 for illuminating the trolley wires 3R and 3L. In this case, the illumination of the trolley wires 3R and 3L with the illuminating device 51 keeps high contrast between the sky and the trolley wires, by which the trolley wires can be detected precisely even when such high contrast is hardly achieved (evening, nighttime, rainy weather, etc.).

The system may also be constructed by combining two or more sensors.

Figure 11:
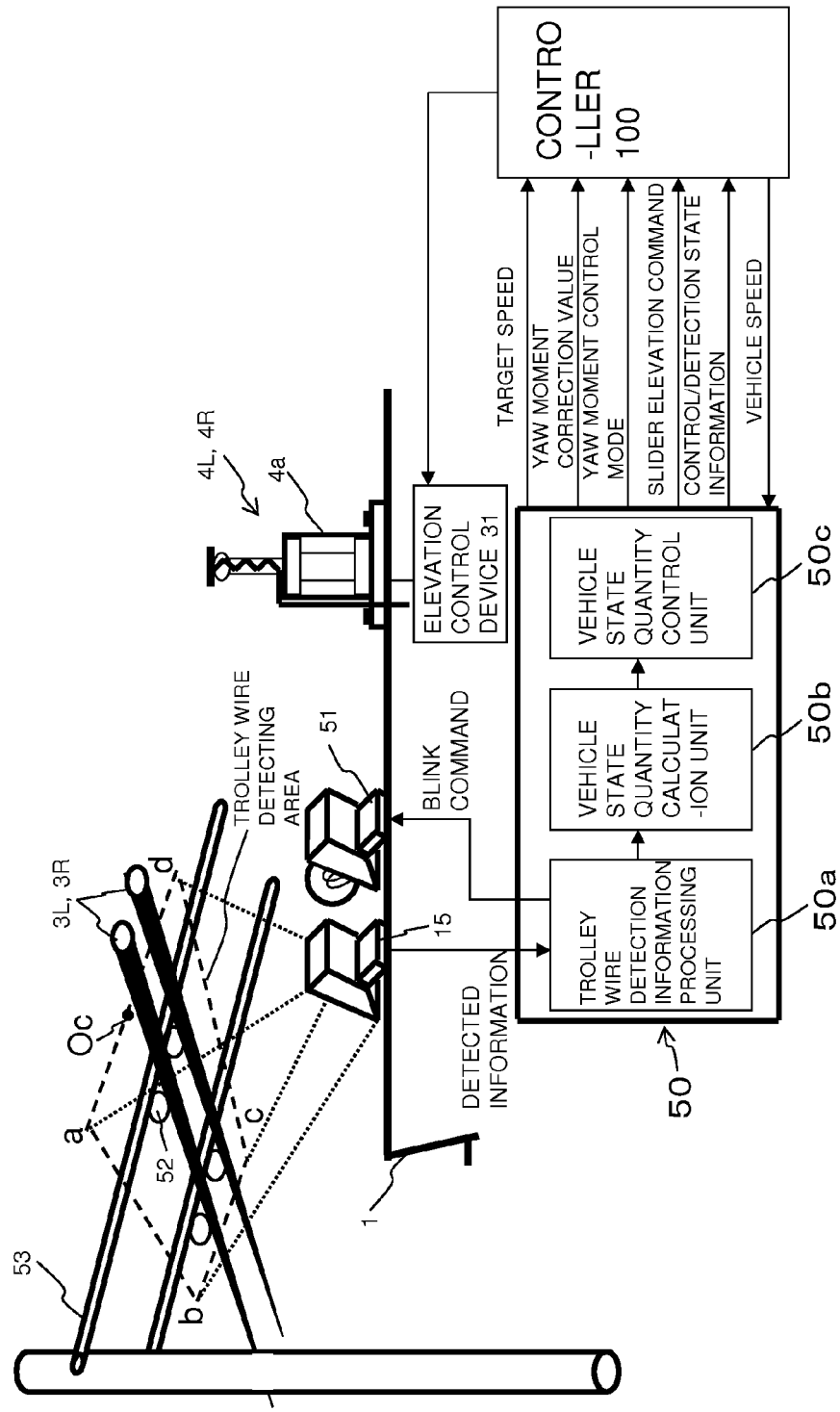
FIG. 11 is a schematic diagram showing the configuration of a vehicle control device and the input-output relationship between the vehicle control device and the controller.

FIG. 11 is a schematic diagram showing the configuration of the vehicle control device 50 and the input-output relationship between the vehicle control device 50 and the controller 100. As shown in FIG. 11, the vehicle control device 50 includes a trolley wire detection information processing unit 50*a*, a vehicle state quantity calculation unit 50*b*, and a vehicle state quantity control unit 50*c*. The trolley wire detection information processing unit 50*a* acquires information on the relative positional relationship between the vehicle and the trolley wires by processing information detected by the trolley wire detecting device 15. The vehicle state quantity calculation unit 50*b* calculates state quantities of the vehicle based on the information acquired by the trolley wire detection information processing unit 50*a*. The vehicle state quantity control unit 50*c* controls the vehicle state quantities based on the result of the calculation by the vehicle state quantity calculation unit 50*b*. The trolley wires 3R and 3L are supported by supports 53 via insulators 52. The vehicle control device 50 outputs a target speed correction value, the yaw moment correction value, the yaw moment control mode, the elevation control device elevation command, control/detection state information, etc.

In this embodiment, the explanation of the detection of the trolley wires will be given of a case where a camera is used as the trolley wire detecting device 15 and the relative positional relationship between the vehicle and the trolley wires in the X-Y plane is detected by performing image processing. Thus, the trolley wire detecting device 15 is implemented by a camera and the trolley wire detection information processing unit 50*a* is implemented by an image information processing unit which processes the image information captured by the camera 15.

<Camera 15 and Image Information Processing Unit 50*a*>

The camera 15 captures images of the trolley wires 3R and 3L. In this case where the two trolley wires 3R and 3L are shot by one camera, the camera 15 is desired to be placed at the center of the right and left trolley wires 3R and 3L. It is also possible to shoot each of the right and left trolley wires 3R and 3L respectively with one camera. The image information captured by the camera 15 is sent to the image information processing unit 50*a* of the vehicle control device 50. The image information represents pixel arrangement in the area shot by the camera 15. The image information processing unit 50*a* converts the image information into necessary information.

When a strong light source exists in the shooting direction of the camera 15, a whitening and blurring effect called "halation" can occur to the image inputted to the image information processing unit 50*a* and this can disable the recognition of the target of detection. As a countermeasure against this problem, it is possible to use two cameras: one for shooting the trolley wires 3R and 3L in front of the vehicle and another for shooting the trolley wires 3R and 3L in back of the vehicle. When the image information processing unit 50*a* judges that the halation has occurred in an image captured by one camera, a correction can be made by use of the other camera. The halation can be detected according to publicly known methods. The two-camera configuration is effective not only when the halation occurs but also when the visual field of one camera is blocked. When the image information processing unit 50*a* judges that the visual field of one camera is blocked by dirt, mud, etc., a correction can be made similarly by using the other camera. It is also possible to enclose the camera 15 with a housing, make the camera 15 shoot the trolley wires 3R and 3L through glass of the housing, and wash the glass with a wiper, washer fluid, etc. when the image information processing unit 50*a* judges that the visibility through the glass has been deteriorated by dirt, mud, etc.

When the image information processing unit 50*a* judges that the amount of ambient light is insufficient for the detection of the trolley wires 3R and 3L (twilight, darkness, etc.), the image information processing unit 50*a* may output a blink command to the illuminating device 51 to make the illuminating device 51 illuminate the trolley wires 3R and 3L and maintain high contrast between the sky and the trolley wires.

Figure 12:
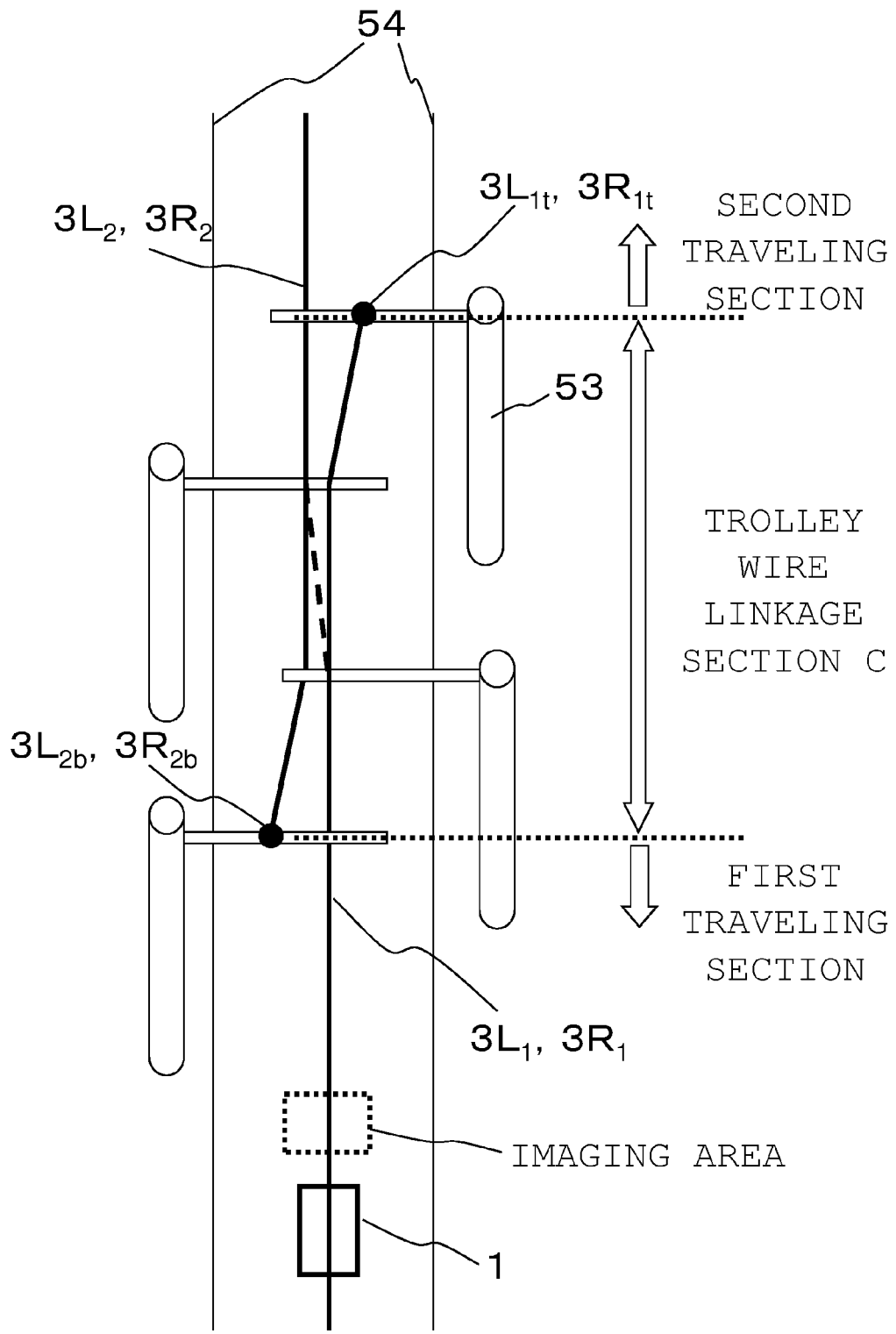
FIG. 12 is a schematic diagram showing a trolley wire linkage section.
Figure 13:
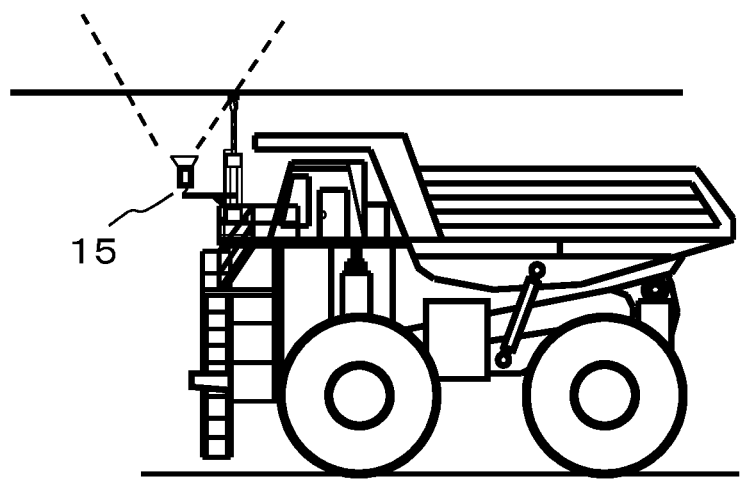
FIG. 13 is a schematic diagram showing the positional relationship between the vehicle and an imaging area of a camera (detecting area of a trolley wire detecting device) viewed from the side of the vehicle.
Figure 14:
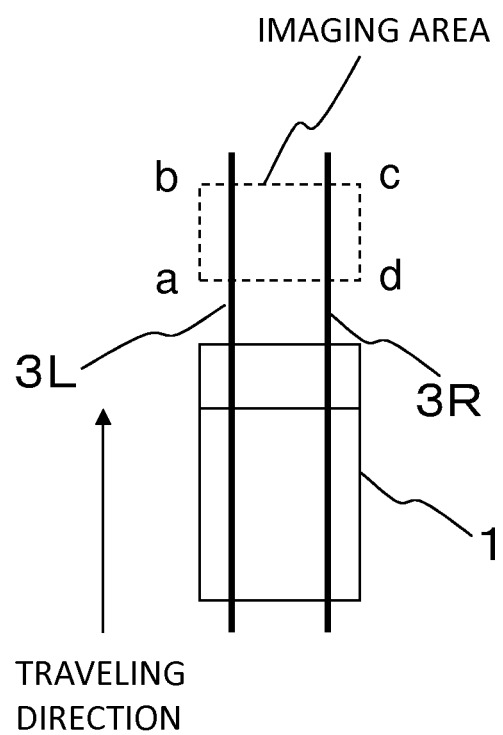
FIG. 14 is a schematic diagram showing the positional relationship between the vehicle and the imaging area of the camera (the detecting area of the trolley wire detecting device) viewed from above (above the vehicle).
Figure 15:
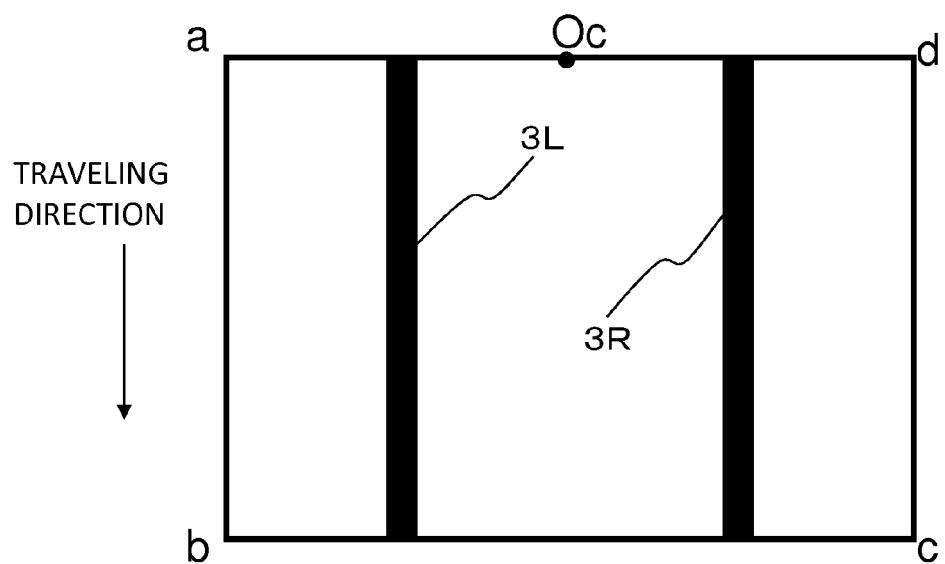
FIG. 15 is a schematic diagram showing an image captured by the camera.

In this embodiment, a case where the dump truck (vehicle) is traveling in a trolley traveling section like the one shown in FIG. 12 and the camera 15 captures images in the direction directly above the vehicle as shown in FIG. 13 (not in the oblique direction as shown in FIG. 11) will be considered for the simplicity of the explanation. FIG. 12 is a schematic diagram showing an area around a trolley wire linkage section in this embodiment viewed from above. In FIG. 12, the vehicle 1 is traveling from the bottom toward the top of the schematic diagram. The area in front of the vehicle 1 and surrounded by dotted lines represents the imaging area of the camera 15. The solid lines on both sides of the vehicle 1 represent lane edges 54. Among the trolley wires 3R and 3L, the first trolley wires $3R_1$ and $3L_1$ form a first traveling section where only the first trolley wires $3R_1$ and $3L_1$ are installed, thereafter extend in parallel with new second trolley wires $3R_2$ and $3L_2$ for a certain interval in the trolley wire linkage section C, and is finally connected to trolley wire terminating end parts $3R_{1b}$ and $3L_{1t}$. Meanwhile, the second trolley wires $3R_2$ and $3L_2$ extend from trolley wire beginning end parts $3R_{2b}$ and $3L_{2b}$ in parallel with the first trolley wires $3R_1$ and $3L_1$ for a certain interval and thereafter form a second traveling section where only the second trolley wires $3R_2$ and $3L_2$ are installed. In this case, the imaging area a, b, c, d of the camera 15 (detecting area of the trolley wire detecting device) is set in front of the vehicle as shown in FIG. 14. FIG. 15 is a schematic diagram showing an image captured by the camera 15 in this case. Since the camera 15 has shot the image of the trolley wires 3R and 3L from below in FIG. 15, the anteroposterior relationship among the points a, b, c and d (positional relationship between the line a-d and the line b-c) and the traveling direction of the vehicle are opposite to those in FIG. 14 in which the trolley wires 3R and 3L are viewed from above.

Figure 16:
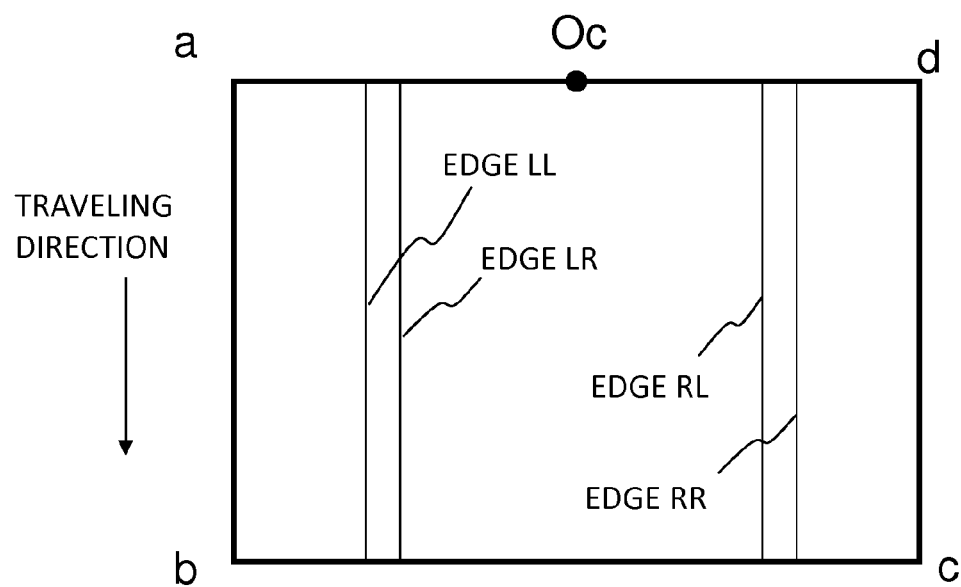
FIG. 16 is a schematic diagram showing a process (edge extraction) performed on the captured image.
Figure 17:
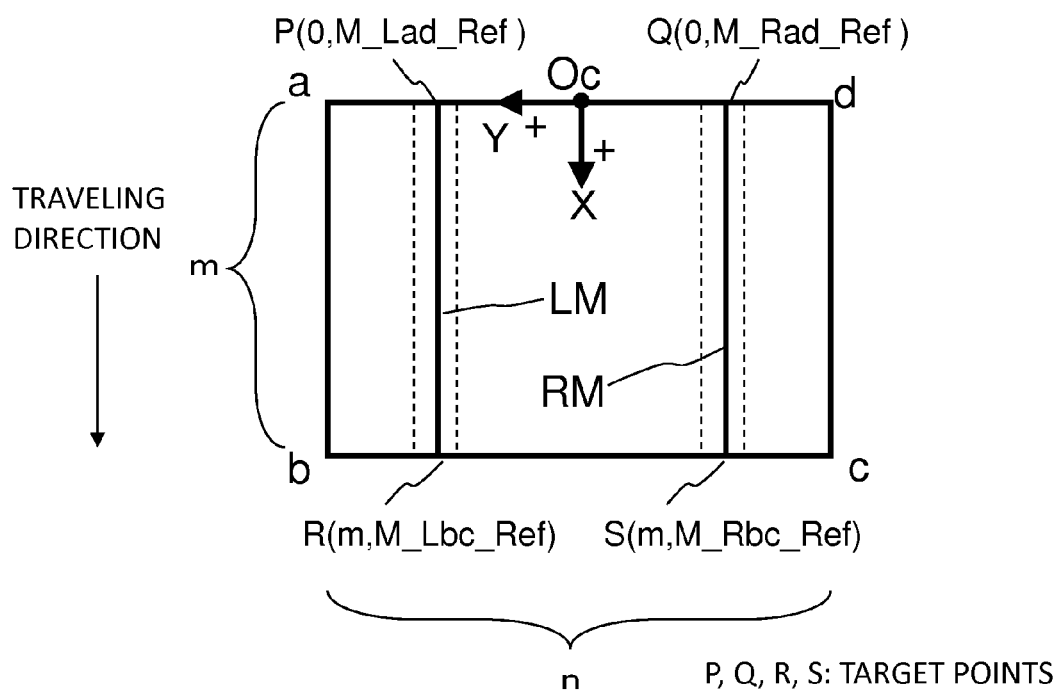
FIG. 17 is a schematic diagram showing a process (center line extraction) performed on the captured image.

As shown in FIG. 15, in the image information acquired by the camera 15, the trolley wires 3R and 3L appear in parallel with the traveling direction (in the vertical direction in the image). On this image information, a process for extracting edge parts (edging process) is performed as shown in FIG. 16. By the edging process, the right trolley wire 3R is split into edges RR and RL, while the left trolley wire 3L is split into edges LR and LL. Subsequently, as shown in FIG. 17, a center line of the edges is determined for each of the right and left trolley wires 3R and 3L (a center line RM for the right trolley wire 3R and a center line LM for the left trolley wire 3L). Then, a coordinate system in regard to the pixel number is set with its origin situated at the top center Oc of the image (with its X-axis extending in the direction parallel to the line ab and its Y-axis extending in the direction parallel to the line da). Subsequently, the intersection point P (0, M_Lad_Ref) of the center line LM and the line ad, the intersection point Q (0, M_Rad_Ref) of the center line RM and the line ad, the intersection point R (m, M_Lbc_Ref) of the center line LM and the line bc, and the intersection point S (m, M_Rbc_Ref) of the center line RM and the line bc are set with respect to the origin Oc. These points P, Q, R and S, existing on the trolley wires 3R and 3L, are defined as target points. Incidentally, the number "m" represents the number of pixels in the vertical direction and the number "n" represents the number of pixels in the horizontal direction.

If each trolley wire 3R, 3L is situated at the center of each slider 4Ra, 4La when the vehicle is traveling straight at the center of the two trolley wires 3R and 3L and in parallel with the trolley wires 3R and 3L, this serves as robustness against deviations (displacement) caused by lateral (right/left) misalignment and vibration (jolting) of the vehicle. Therefore, the vehicle is desired to keep on traveling in such a state.

Figure 18:
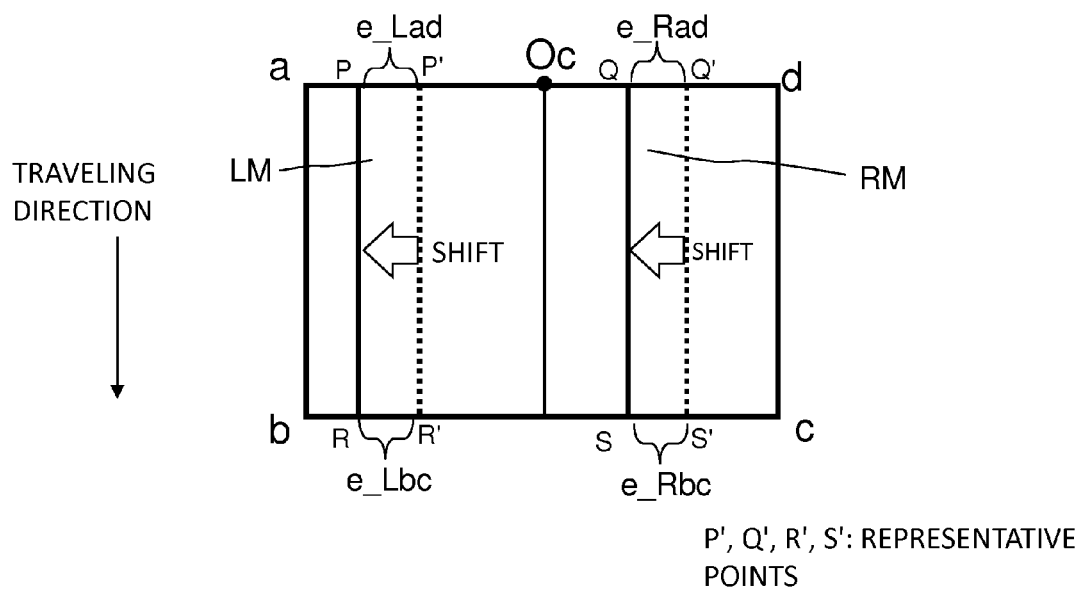
FIG. 18 is a schematic diagram showing a camera image captured when the vehicle has shifted to the left with respect to the trolley wires.

FIG. 18 shows a state in which the vehicle has shifted to the left. By setting representative points of the vehicle 1 at intersection points of lines parallel to the X-axis (i.e., in the traveling direction of the vehicle 1) and passing through the center of the slider 4Ra or 4La and the lines ad and bc of the imaging area, the points P', Q', R' and S' shown in FIG. 18 are acquired as the representative points. These representative points are points used for control for controlling the position of the vehicle with respect to the trolley wires 3R and 3L. Therefore, the representative points P', Q', R' and S' can also be referred to as control points. Coordinates of these representative points are defined as M_Lad_Cont, M_Rad_Cont, M_Lbc_Cont and M_Rbc_Cont, respectively.

Figure 19:
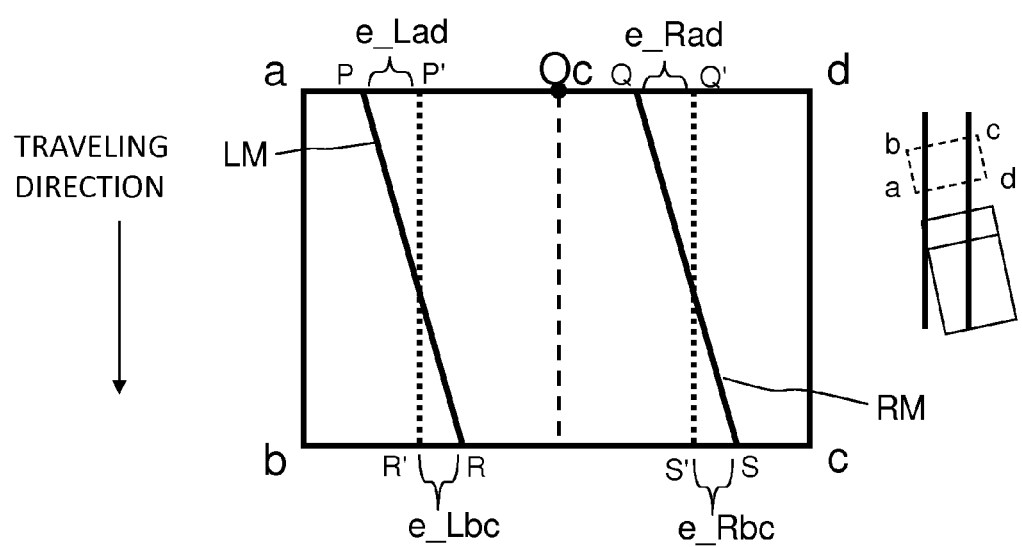
FIG. 19 is a schematic diagram showing a camera image captured when the vehicle is traveling obliquely to the trolley wires.

FIG. 19 shows a case where the vehicle is traveling obliquely to the trolley wires 3R and 3L. Also in this case, the representative points of the vehicle are defined as the points P', Q', R' and S'.

Further, whether new trolley wires (the second trolley wires $3R_2$ and $3L_2$) other than the currently detected trolley wires (the first trolley wires $3R_1$ and $3L_1$) are detected in the imaging area a, b, c, d or not is judged.

The image information processing unit 50a sends the coordinate information on the target points and the representative points and information representing whether the second trolley wires $3R_2$ and $3L_2$ have been detected or not to the vehicle state quantity calculation unit 50b.

<Vehicle State Quantity Calculation Unit 50b>

The vehicle state quantity calculation unit 50b in this embodiment calculates deviations between the representative points P', Q', R' and S' and the target points P, Q, R and S. The deviations e_Lad, e_Rad, e_Lbc and e_Rbc between the representative points and the target points are calculated as follows:

$$e\_Lad = M\_Lad\_Ref - M\_Lad\_Cont \quad (1)$$

$$e\_Rad = M\_Rad\_Ref - M\_Rad\_Cont \quad (2)$$

$$e\_Lbc = M\_Lbc\_Ref - M\_Lbc\_Cont \quad (3)$$

$$e\_Rbc = M\_Rbc\_Ref - M\_Rbc\_Cont \quad (4)$$

These deviations take on positive/negative values when the vehicle has shifted leftward/rightward with respect to the trolley wires.

The displacement (deviation) is defined similarly also when the vehicle is traveling obliquely to the trolley wires 3R and 3L as shown in FIG. 19. In this case, the inclination $e\theta\_L$ of the vehicle with respect to the left trolley wire 3L and the inclination $e\theta\_R$ of the vehicle with respect to the right trolley wire 3R can be calculated as follows:

$$e\theta\_L = (e\_Lbc - e\_Lad)/m \quad (5)$$

$$e\theta\_R = (e\_Rbc - e\_Rad)/m \quad (6)$$

When the camera is successfully detecting the right and left trolley wires 3R and 3L as in this embodiment, the expressions (2), (4) and (6) are redundant to the expressions (1), (3) and (5). Therefore, it is desirable to perform the calculation by using information on a successful side (on which the displacement and the inclination can be calculated successfully) when the calculation of the displacement and the inclination is impossible on one side for some reason.

Further, based on the information from the image information processing unit 50a regarding the detection of the second trolley wires $3R_2$ and $3L_2$, the vehicle state quantity calculation unit 50b figures out whether the vehicle 1 is traveling in the trolley wire linkage section C or not. Incidentally, the trolley wire linkage section C is the section where the terminating end parts $3R_{1t}$ and $3L_{1t}$ of the first trolley wires $3R_1$ and $3L_1$ and the beginning end parts $3R_{2b}$ and $3L_{2b}$ of the second trolley wires $3R_2$ and $3L_2$ extend in parallel.

<Vehicle State Quantity Control Unit 50c>

Figure 20:
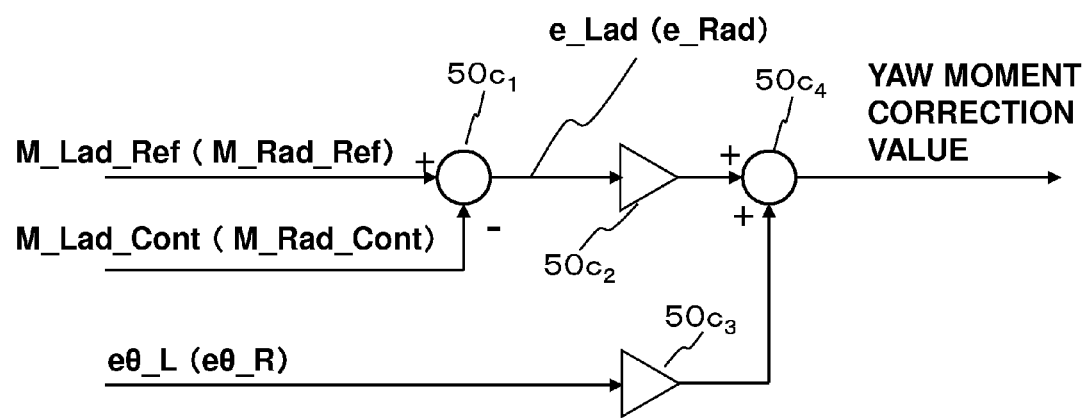
FIG. 20 is a block diagram showing the details of a function of a vehicle state quantity control unit (flow of calculation for converting deviation between a present position and a target position into the yaw moment correction value)

Next, the vehicle state quantity control unit 50c will be explained below. The vehicle state quantity control unit 50c in this embodiment calculates the yaw moment correction value for making at least one of the representative points coincide with the corresponding target point. First, a process for generating the yaw moment correction value by multiplying the displacement and the inclination represented by the expressions (1)-(6) by gain factors is shown in FIG. 20. FIG. 20 is a block diagram showing the details of the function of the vehicle state quantity control unit 50c. In this example, the point P or Q is used as the target point and the point P' or Q' is used as the representative point.

As shown in FIG. 20, a calculation unit $50c_1$ of the vehicle state quantity calculation unit 50b determines the deviation e_Lad (e_Rad) between the representative point P' (Q') and the target point P (Q) by calculating the difference between the coordinate value M_Lad_Cont (M_Rad_Cont) of the representative point P' (Q') and the coordinate value M_Lad_Ref (M_Rad_Ref) of the target point P (Q) inputted from the vehicle state quantity calculation unit $50b$. A conversion unit $50c_2$ of the vehicle state quantity control unit $50c$ converts the deviation e_Lad (e_Rad) into a yaw moment value by multiplying the deviation by a gain factor. Meanwhile, a conversion unit $50c_3$ converts the inclination e$\theta$_L (e$\theta$_R) of the vehicle inputted from the vehicle state quantity calculation unit $50b$ into a yaw moment value by multiplying the inclination by a gain factor. A calculation unit $50c_4$ calculates the yaw moment correction value by adding the two yaw moment values together and outputs the calculated yaw moment correction value to the yaw moment control unit 102.

When information indicating that the vehicle 1 is traveling in the trolley wire linkage section C is inputted, the vehicle state quantity control unit $50c$ outputs 0 as the yaw moment correction value irrespective of the values of the aforementioned M_Lad_Ref (M_Rad_Ref), M_Lad_Cont (M_Rad_Cont) and e$\theta$_L (e$\theta$_R).

The vehicle state quantity control unit $50c$ also determines the yaw moment control mode which has been explained referring to FIG. 8. The aforementioned yaw moment control unit 102 of the controller 100 calculates the motor torque command values and the steerage torque correction value based on the yaw moment correction value and the yaw moment control mode determined by the vehicle state quantity control unit $50c$ and then outputs the motor torque command values and the steerage torque correction value to the inverter control device 30 and the steering control device 32, respectively.

With the configuration and operation described above, the control device 200 (made up of the vehicle control device 50, the controller 100, the inverter control device 30 and the steering control device 32) executes control to give an appropriate yaw moment to the vehicle 1 so that the vehicle 1 travels while tracing the first trolley wires $3R_1$ and $3L_1$ or the second trolley wires $3R_2$ and $3L_2$ when the vehicle 1 is traveling outside the trolley wire linkage section C. In this case, the control device 200 executes control to give an appropriate yaw moment to the vehicle 1 so that the representative point Z approaches the target point T. Further, the control device executes control to give an appropriate yaw moment to the vehicle 1 so that the inclination e$\theta$_L (e$\theta$_R) decreases. When the vehicle 1 is traveling in the trolley wire linkage section C, the control device 200 executes control so that the yaw moment for tracing the first trolley wires $3R_1$ and $3L_1$ or the second trolley wires $3R_2$ and $3L_2$ is not outputted.

Besides the simple gain control shown in FIG. 20, integral control, derivative control, etc. may also be employed.

<Effect>

According to this embodiment configured as above, the following effects are achieved: Since the trolley wires 3R and 3L are detected from below in this embodiment, there are less factors leading to detection errors compared to the conventional technique detecting lane markers, etc. by capturing images of the ground surface. As a result, the accuracy of the trolley wire detection is improved. Thanks to the improvement of the trolley wire detection accuracy, the control accuracy of the yaw moment control for making the vehicle travel while tracing the trolley wires 3R and 3L is improved and the central position of each slider 4Ra/4La of the traveling vehicle hardly deviates widely from the trolley wire 3R/3L in the lateral direction. Consequently, stable trolley traveling is made possible and the operating load on the driver in the trolley traveling section can be lightened considerably.

Further, along with the tracing of the trolley wires (first trolley wires $3R_1$ and $3L_1$), whether the vehicle 1 is traveling in the trolley wire linkage section C or not is detected and the control is performed not to execute the yaw moment control in the trolley wire linkage section C. With this control, the vehicle is prevented from continuing tracing the first trolley wires $3R_1$ and $3L_1$ and traveling toward the lane edge 54. After the vehicle has passed through the trolley wire linkage section C, the yaw moment control is executed again to trace the trolley wires (second trolley wires $3R_2$ and $3L_2$). Therefore, the trolley wire contacting each slider is shifted from the first trolley wire $3R_1/3L_1$ to the second trolley wire $3R_2/3L_2$ without the need of careful steering operation by the driver. Consequently, stable trolley traveling becomes possible even in cases where the length of the trolley traveling section is greater than the reference length of one trolley wire.

In the case where a camera 15 is used as the trolley wire detecting device, illuminating the trolley wires 3R and 3L with the illuminating device 51 is effective for maintaining high contrast between the sky and the trolley wires 3R and 3L. By use of the illuminating device 51, the yaw moment control for making the vehicle travel while tracing the trolley wires 3R and 3L can be executed with high accuracy not only in the daytime with fine weather but also in conditions in which such high contrast between the sky and the trolley wires 3R and 3L is hardly achieved (evening, nighttime, rainy weather, etc.).

Furthermore, the control device 200 is capable of executing the yaw moment control by using the vehicle control device 50 and the controller 100 as separate components. With this configuration, even when the controller 100 is an already-existing controller, the yaw moment control in accordance with the present invention can be carried out by just adding the vehicle control device 50 to the controller. The parameters of the yaw moment control can be adjusted just by changing the functions of the vehicle control device 50. Consequently, high flexibility can be given to the control system.

<Another Embodiment of Vehicle Control Device 50>

Next, another embodiment of the vehicle control device 50 will be described below.

The main difference between this embodiment and the above embodiment is as follows: In the above embodiment, when the vehicle is not traveling in the trolley wire linkage section C, that is, when the vehicle is traveling in the first traveling section (in which only the first trolley wires $3R_1$ and $3L_1$ are installed) or the second traveling section (in which only the second trolley wires $3R_2$ and $3L_2$ are installed), only the control to give a yaw moment to the vehicle 1 so that the vehicle 1 travels while tracing the first trolley wires $3R_1$ and $3L_1$ or the second trolley wires $3R_2$ and $3L_2$ (hereinafter referred to as "trolley wire linkage control and tracing control" as needed) is executed. In this embodiment, elevation control of the slider 4Ra or 4La of the power collector 4R/4L (hereinafter referred to as "slider elevation control" as needed) is executed in addition to the trolley wire linkage control and tracing control. Further, when the trolley wire linkage control and tracing control is executed, a dead zone is set in regard to the deviation between the representative point and the target point. The trolley wire tracing control of the trolley wire linkage control and tracing control is carried out only when the deviation has exceeded the dead zone.

<Image Information Processing Unit $50a$>

The processing by the image information processing unit $50a$ is identical with that in the above embodiment. The image information processing unit $50a$ sends the coordinate information on the representative points P', Q', R' and S' and the information on whether the second trolley wires $3R_2$ and $3L_2$ have been detected or not to the vehicle state quantity calculation unit $50b$.

<Vehicle State Quantity Calculation Unit 50b and Vehicle State Quantity Control Unit 50c>

The vehicle state quantity calculation unit 50b is a component for calculating state quantities to be used for generating control values and command values such as the yaw moment correction value for the trolley wire linkage control and tracing control, the elevation control device elevation command for the elevation control of the slider 4Ra or 4La of the power collectors 4R and 4L, the yaw moment control mode, and the target speed correction value. The vehicle state quantity control unit 50c is a component for generating and outputting the control values and the command values (the yaw moment correction values, the elevation control device elevation command, the yaw moment control mode, the target speed correction value, etc.) based on the result of the calculation by the vehicle state quantity calculation unit 50b.

<Trolley Wire Detecting Area and Coordinate System>

First, a trolley wire detecting area and a coordinate system used by the vehicle state quantity calculation unit 50b will be explained below.

Figure 21:
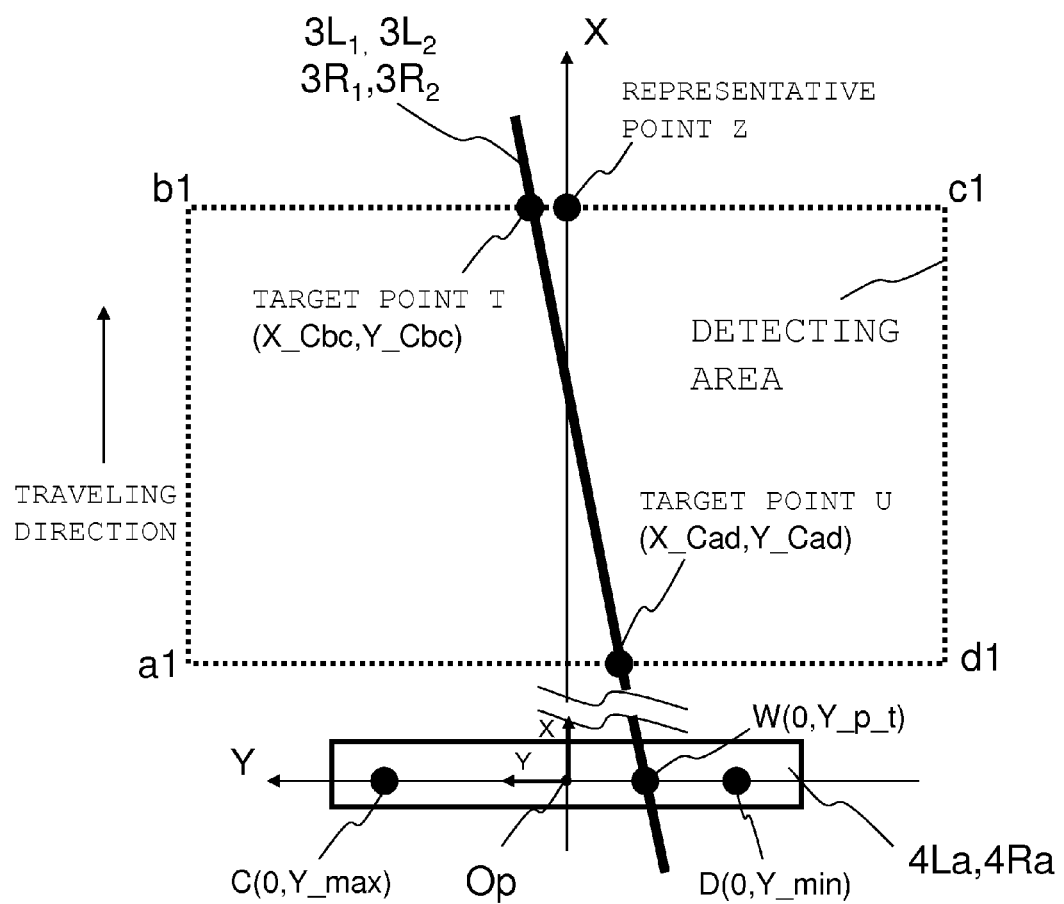
FIG. 21 is a schematic diagram showing a trolley wire detecting area and a coordinate system used in another example of the vehicle control device.

FIG. 21 is a schematic diagram showing the trolley wire detecting area and the coordinate system used in this embodiment.

Based on the image information on the imaging area a, b, c, d (see FIGS. 17-19) acquired by the image information processing unit 50a from the camera 15, the vehicle state quantity calculation unit 50b extracts and acquires an area like the area a1, b1, c1, d1 shown in FIG. 21 as the trolley wire detecting area. The side a1-d1 corresponds to a part of the side a-d of the imaging area a, b, c, d shown in FIGS. 17-19, while the side b1-c1 corresponds to a part of the side b-c of the imaging area a, b, c, d. The trolley wire detecting area a1, b1, c1, d1 indicates the positional relationship between the slider 4Ra or 4La and the trolley wire $3R_1$ or $3L_1$ or the trolley wire $3R_2$ or $3L_2$ when the trolley wire $3R_1/3L_1$ or $3R_2/3L_2$ is viewed from above. In the trolley wire detecting area a1, b1, c1, d1, a straight line passing through the center of the slider 4Ra/4La (regarding the lateral direction) and extending in the traveling direction of the vehicle passes through the center of the side a1-d1 and the center of the side b1-c1. As mentioned above, since the trolley wire $3R_1/3L_1$ or $3R_2/3L_2$ is shot from below in the image information on the imaging area a, b, c, d acquired by the camera 15, the anteroposterior relationship (vertical direction in FIG. 21) in the trolley wire detecting area a1, b1, c1, d1 (viewing the trolley wire $3R_1/3L_1$ or $3R_2/3L_2$ from above) is opposite to that in the imaging area a, b, c, d.

Further, the vehicle state quantity calculation unit 50b sets a coordinate system having the origin (Op) at the center of the slider 4Ra/4La, the X-axis extending in the traveling direction, and the Y-axis extending leftward with respect to the traveling direction. In the coordinate system, the vehicle state quantity calculation unit 50b sets a representative point at the intersection point Z of the X-axis and the side b1-c1, and sets two target points T and U at the intersection point T of the side b1-c1 and the trolley wire $3R_1/3L_1$ or $3R_2/3L_2$ and at the intersection point U of the side a1-d1 and the trolley wire $3R_1/3L_1$ or $3R_2/3L_2$. Since the camera 15 and the slider 4Ra/4La of the power collector 4R/4L are both attached to the vehicle and the positional relationship between the two components are already known, the coordinates of the intersection points Z, T and U can be determined with ease by means of coordinate transformation, by transforming coordinate values of the points P', P and R in the coordinate system with the origin Oc shown in FIGS. 17-19 into coordinate values in the coordinate system with the origin Op shown in FIG. 21.

<Trolley Wire Linkage Control and Tracing Control>

First, the vehicle state quantity calculation unit 50b calculates the deviation between the representative point Z and the target point T. Since the Y-coordinate value Y_Cbc of the target point T in front of the slider 4Ra/4La equals the deviation between the representative point Z and the target point T, the vehicle state quantity calculation unit 50b uses the Y-coordinate value Y_Cbc of the target point T as the deviation between the representative point Z and the target point T. The deviation Y_Cbc takes on a positive/negative value when the vehicle has shifted rightward/leftward with respect to the trolley wires.

When the vehicle is traveling obliquely to the trolley wire $3R_1/3L_1$ or $3R_2/3L_2$, similar displacement is defined also in regard to the inclination of the vehicle. In this case, the inclination θ_t of the vehicle with respect to the trolley wire $3R_1/3L_1$ or $3R_2/3L_2$ at a certain time t is represented by the following expression by using the coordinate values of the two target points T and U:

$$\theta\_t = (Y\_Cbc - Y\_Cad)/(X\_Cbc - X\_Cad) \quad (7)$$

The vehicle state quantity control unit 50c calculates the yaw moment correction value (for making the representative point Z coincide with the target point T) by using the deviation Y_Cbc between the representative point Z and the target point T or the inclination θ_t of the vehicle.

Figure 22:
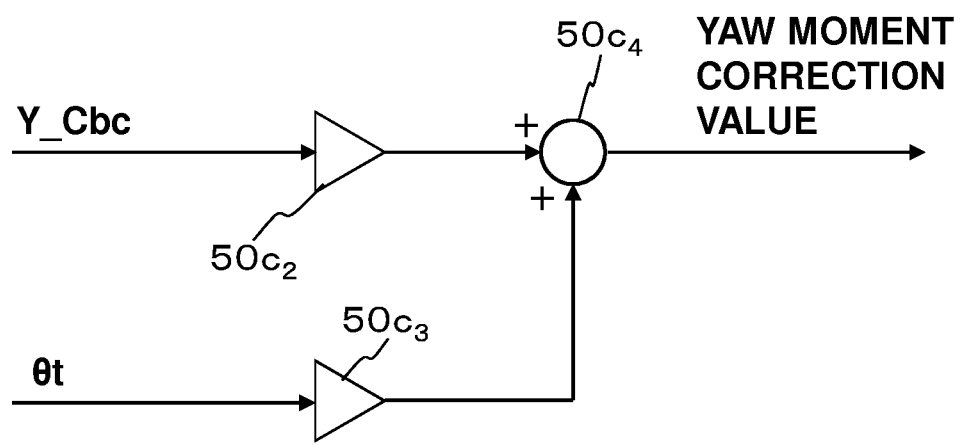
FIG. 22 is a block diagram showing the details of a function of another example of the vehicle state quantity control unit (flow of calculation for converting deviation between a present position and a target position into the yaw moment correction value).

FIG. 22 is a block diagram showing a process for calculating the yaw moment correction value by using the deviation Y_Cbc or the inclination θ_t. In the vehicle state quantity control unit 50c, a conversion unit $50c_2$ (the conversion unit $50c_2$ shown in FIG. 20) converts the deviation Y_Cbc into a yaw moment value by multiplying the deviation Y_Cbc by a gain factor. Similarly, a conversion unit $50c_3$ converts the inclination θ_t into a yaw moment value by multiplying the inclination θ_t by a gain factor. A calculation unit $50c_4$ calculates the yaw moment correction value by adding the two yaw moment values together and outputs the calculated yaw moment correction value to the yaw moment control unit 102.

Further, the vehicle state quantity calculation unit 50b figures out whether the vehicle 1 is traveling in the trolley wire linkage section C or not based on the information from the image information processing unit 50a regarding the detection of the second trolley wires $3R_2$ and $3L_2$. The vehicle state quantity control unit 50c outputs 0 as the yaw moment correction value irrespective of the values of the aforementioned deviation Y_Cbc and inclination θ_t when a signal indicating that the vehicle 1 is traveling in the trolley wire linkage section C is inputted.

The other functions of the vehicle state quantity control unit 50c related to the trolley wire tracing control are equivalent to those in the first embodiment.

<Slider Elevation Control>

The vehicle state quantity calculation unit 50b calculates the inclination θ_t of the vehicle at a certain time t. As mentioned above, this inclination θ_t can be calculated according to the above expression (7) by using the coordinate values of the two target points T and U shown in FIG. 21.

Further, the vehicle state quantity calculation unit 50b calculates the Y-coordinate Y_p_t of a point W which is defined as the intersection point of the slider 4Ra/4La and the trolley wire $3R_1/3L_1$ or $3R_2/3L_2$.

The Y-coordinate Y_p_t of the point W can be approximated as follows:

$$Y\_p\_t = Y\_Cbc - \theta\_t \times X\_Cbc \text{ or}$$

$$Y\_p\_t = Y\_Cad - \theta\_t \times X\_Cad \quad (8)$$

Here, Y_P_t+1 as the value of Y_p_t one step later (after a time interval Δ) is expressed by using the vehicle speed V as follows:

$$Y\_p\_t+1 = Y\_p\_t + V \times \tan \theta\_t \quad (9)$$

Assuming that the permissible range of the Y-coordinate Y_p_t of the point W on the slider 4Ra/4La, within which the slider 4Ra/4La is in contact with the trolley wire $3R_1/3L_1$ or $3R_2/3L_2$ and satisfactory electric power can be acquired continuously, is Y_min (Y-coordinate of a point D)<Y_p_t<Y_max (Y-coordinate of a point C) between points C and D, it can be said that there is no problem with elevating the slider 4Ra/4La in a range satisfying Y_min<Y_p_t+1<Y_max.

At the present time t, the vehicle state quantity calculation unit 50*b* judges whether or not the Y-coordinate Y_p_t of the point W will be outside the range between Y_min (Y-coordinate of the point D) and Y_max (Y-coordinate of the point C) in the next control step t+1, and outputs the result of the judgment to the vehicle state quantity control unit 50*c*. If the Y-coordinate Y_p_t of the point W will be outside the range between Y_min (Y-coordinate of the point D) and Y_max (Y-coordinate of the point C), the vehicle state quantity control unit 50*c* outputs a command signal for lowering the sliders 4Ra and 4La or prohibiting the elevation of the sliders 4Ra and 4La. In contrast, if the Y-coordinate Y_p_t will be within the range, the vehicle state quantity control unit 50*c* outputs a command signal for elevating the sliders 4Ra and 4La or permitting the elevation of the sliders 4Ra and 4La. The vehicle state quantity control unit 50*c* may also correct the reaction force of the reaction force motor 42 (see FIG. 5) of the steering device 40 depending on the Y-coordinate Y_p_t of the point W. For example, the correction may be made to decrease the reaction force in the range satisfying Y_min<Y_p_t+1<Y_max and to increase the reaction force in the ranges satisfying Y_p_t+1≤Y_min or Y_max≤Y_p_t+1.

In this example, the vehicle control device 50 is executing both the trolley wire linkage control and tracing control and the slider elevation control. In the trolley wire linkage control and tracing control, when the vehicle is traveling outside the trolley wire linkage section C, the vehicle state quantity control unit 50*c* outputs the yaw moment correction value calculated by multiplying the deviation Y_Cbc and the inclination θ_t by the gain factors. Since the outputting of the yaw moment correction value continues until the deviation Y_Cbc and the inclination θ_t become 0, the Y-coordinate Y_p_t of the point W on the slider 4Ra/4La and the inclination θ_t of the vehicle eventually converge on 0 and the vehicle tends to travel while tracing the trolley wire. Also after the passage through the trolley wire linkage section, the control for tracing the second trolley wires $3R_2/3L_2$ is restarted and the yaw moment correction value is outputted so that the deviation Y_Cbc and the inclination θ_t become 0, by which the vehicle 1 is made to trace the second trolley wire $3R_2/3L_2$ in a similar manner.

<Details of Control Process by Vehicle Control Device 50>

Figure 23:
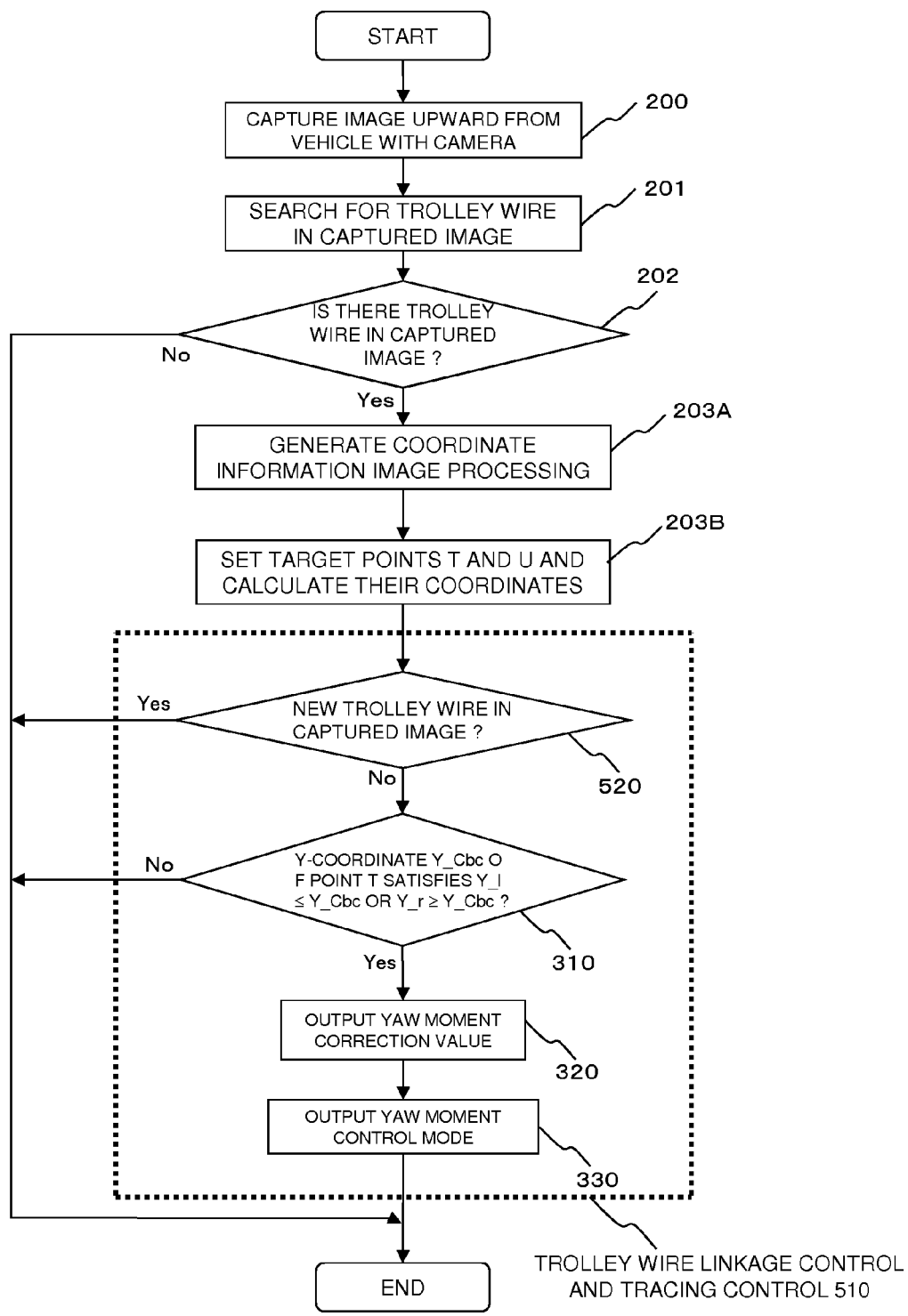
FIG. 23 is a flow chart showing a process flow from upward shooting with the camera to control output in another example of the vehicle control device.
Figure 24:
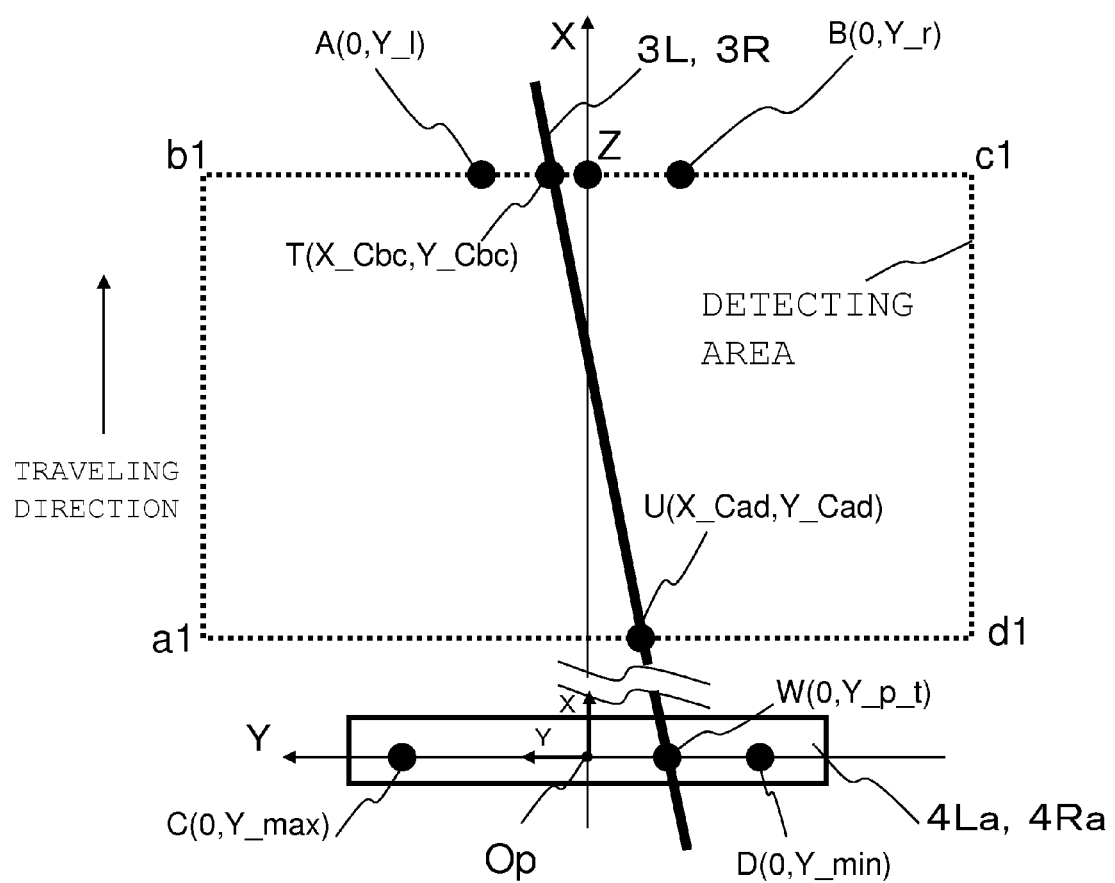
FIG. 24 is a schematic diagram similar to FIG. 21, showing the trolley wire detecting area and the coordinate system in a case where a first threshold value is set.

Details of a control process executed by the above-described vehicle control device 50 will be explained below referring to a flow chart of FIG. 23. FIG. 23 is a flow chart showing the flow of the process from the upward shooting with the camera to the control output. It is assumed as shown in FIG. 13 that the camera is set in front of the vehicle 1 to be on the extension line of the vehicle axis and the number of trolley wires shot with the camera is one as shown in FIG. 12. FIG. 24 is a schematic diagram similar to FIG. 21, wherein a dead zone of the trolley wire tracing control has been set. The target points T and U and the representative point Z have been set for the detecting area a1, b1, c1, d1 as explained above. Further, points A and B specifying the dead zone of the trolley wire tracing control have been set at positions a prescribed distance Y_l, Y_r (first threshold value) apart from the representative point Z.

In the first step 200, the image information processing unit 50*a* captures an image upward from the vehicle 1 with the camera. In step 201, the image information processing unit 50*a* searches the captured image for the trolley wire 3R or 3L. In the search in the step 201, the whole area of the captured image is searched when the detection of the trolley wire 3R/3L is carried out for the first time. After the trolley wire 3R/3L has been detected once, searching the whole area is unnecessary; searching only a limited area in the vicinity of the coordinates of the already detected trolley wires 3R/3L is effective since it leads to reduction of the search time. In step 202, the image information processing unit 50*a* judges whether or not there exists an object corresponding to the trolley wire 3R/3L in the captured image. If no object corresponding to the trolley wire 3R/3L is found, the process is finished. If there exists an object corresponding to the trolley wire 3R/3L, the process advances to step 203A. In the step 203A, the image information processing unit 50*a* executes the edge extraction and the image processing for calculating the center line of the trolley wire 3R/3L.

The process is thereafter handed over to the vehicle state quantity calculation unit 50*b*. In step 203B, the vehicle state quantity calculation unit 50*b* sets the aforementioned target points T and U and calculates the coordinates of the target points T and U. Thereafter, the process using the coordinate information on the target points T and U shifts to a trolley wire linkage control and tracing control step 510 for tracing the trolley wire 3R/3L.

<Trolley Wire Linkage Control and Tracing Control>

At the start of the trolley wire linkage control and tracing control step 510, whether an object corresponding to a new trolley wire (the second trolley wire $3R_2/3L_2$), other than the first trolley wire $3R_1/3L_1$ (included in the collectively called "trolley wire 3R/3L"), is detected in the imaging area a, b, c, d or not is judged (step 520). When no new trolley wire $3R_2/3L_2$ is detected, it means that the vehicle 1 is traveling in the first traveling section (not in the trolley wire linkage section), and thus the process advances to step 310 so as to continue the tracing control for tracing the first trolley wire $3R_1/3L_1$. When a new trolley wire is detected in the step 520, it means that the vehicle 1 is traveling in the trolley wire linkage section C. In this case, if the vehicle 1 continues traveling while tracing the already-existing first trolley wire $3R_1/3L_1$, the vehicle 1 is guided to the terminating end part $3R_{1t}/3L_{1t}$ of the first trolley wire $3R_1/3L_1$ and runs off the lane edge 54. To avoid this problem, the process is ended without outputting the yaw moment for the trolley wire tracing control.

In the trolley wire linkage section C, the vehicle can be considered to be traveling substantially parallel to the trolley wire $3R_1/3L_1$ since the control for tracing the first trolley wire $3R_1/3L_1$ (sufficient control for straight traveling) has been carried out in the previous first traveling section. Therefore, when a new trolley wire (the second trolley wire $3R_2/3L_2$) is detected in the step 520, the vehicle is judged to be traveling in the trolley wire linkage section C and the process is ended without outputting the yaw moment correction value in the section. Since the trolley wire linkage section C is relatively short, the absence of the trolley wire tracing control in the section hardly leads to substantial deviation of the vehicle from the trolley traveling range and the vehicle is prevented from running off the lane edge 54.

Referring again to FIG. 23, in the step 310, the vehicle state quantity calculation unit 50$b$ judges whether or not the target point T exists between the points A and B (Y_l≤Y_Cbc, Y_r≥Y_Cbc) which have been set at positions a prescribed distance apart (Y_l, Y_r) from the representative point Z shown in FIG. 24. When the target point T does not exist between the points A and B, the process advances to step 320 and the vehicle state quantity control unit 50$c$ calculates and outputs the yaw moment correction value.

Figure 25:
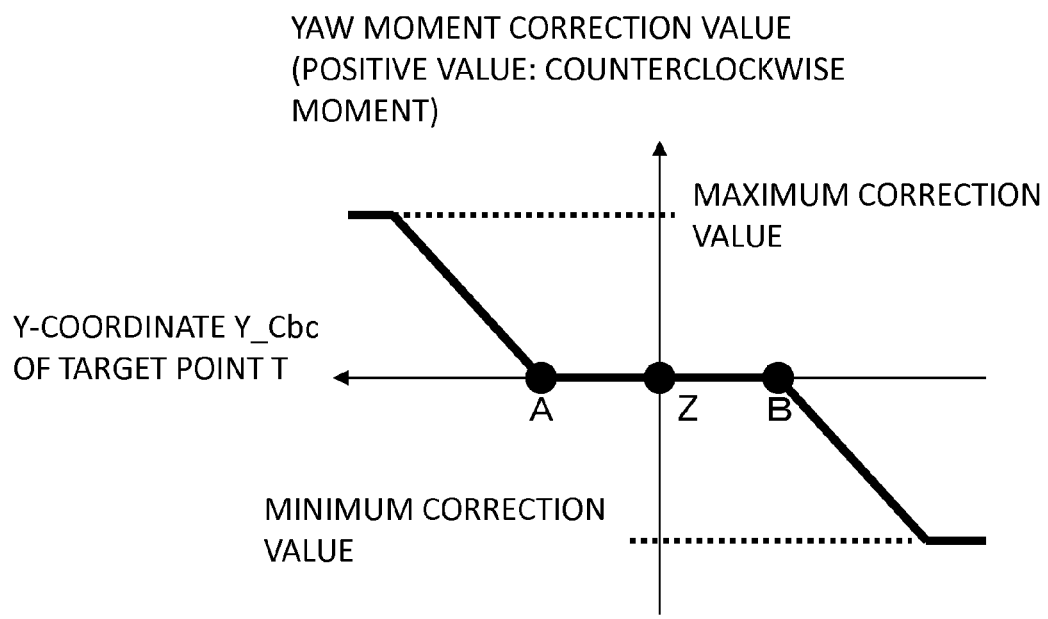
FIG. 25 is a schematic diagram showing an example of a method for calculating the yaw moment correction value corresponding to the position of a target point

FIG. 25 is a schematic diagram showing an example of a method for the calculation of the yaw moment correction value in this case. In FIG. 25, the gradient of the characteristic lines outside the points A and B corresponds to the gain of the conversion unit 50$c_2$ shown in FIG. 22.

As shown in FIG. 25, a yaw moment correction value corresponding to the Y-coordinate value Y_Cbc of the target point T (corresponding to the deviation between the representative point Z and the target point T) is calculated outside the points A and B. Specifically, in the range outside the point A (where Y_Cbc is positive), the yaw moment correction value is increased with the increase in Y_Cbc. In the range outside the point B (where Y_Cbc is negative), the yaw moment correction value is decreased with the decrease in Y_Cbc. According to this calculation, when the target point T does not exist between the points A and B (i.e., when the absolute value of the deviation Y_Cbc between the representative point Z and the target point T is greater than the Y-coordinate value Y_l of the point A or the absolute value of the Y-coordinate value Y_r of the point B as the first threshold value), control is executed to give an appropriate yaw moment to the vehicle 1 so as to make the representative point Z approach the target point T. Further, the control is executed so that the yaw moment given to the vehicle 1 increases with the increase in the absolute value of the deviation Y_Cbc. After the yaw moment correction value has reached a maximum correction value or a minimum correction value, the yaw moment correction value is set constant in order to prevent abrupt/extreme turning of the vehicle. Incidentally, it is also possible to output a constant yaw moment correction value in such cases where the target point T does not exist between the points A and B, instead of calculating and outputting the yaw moment correction value as a variable.

Here, the reason for setting the yaw moment correction value at 0 between the points A and B shown in FIG. 25 will be explained. By the control for making the representative point Z coincide with the target point T, the point W is positioned almost at the center of the slider 4Ra/4La as long as the vehicle 1 is traveling forward. In this case, however, the yaw moment correction value is calculated even when the point W has slightly shifted from the center of the slider 4Ra/4La and that increases the frequency of operation of the actuators implementing the yaw moment correction (the reaction force motor 42 and the steerage motor 43 of the steering device 40 (FIG. 5) and the rear wheel electric motors 6R and 6L (FIG. 3) in this embodiment). By setting the yaw moment correction value at 0 between the points A and B, the frequency of operation of the rear wheel electric motors 6R and 6L can be reduced and high control stability and riding comfort can be secured. The width of the range between the points A and B (in which the yaw moment correction is unnecessary) may be set depending on the width of the slider 4Ra/4La.

Further, by executing the control so as to increase the yaw moment given to the vehicle 1 with the increase in the absolute value of the deviation Y_Cbc, the vehicle 1 is quickly returned to the center of the sliders 4Ra and 4La when the slider 4Ra/4La of the traveling vehicle is about to widely deviate from the trolley wire 3R/3L in the lateral direction. Consequently, the dump truck can securely be prevented from deviating from the lane with the trolley wires 3R and 3L.

In the next step 330, the yaw moment control mode is selected and outputted. In normal traveling, the mode "1" is selected as the yaw moment control mode since there is no request for reducing the vehicle speed (driver's retarder operation or deceleration by other control).

<Another Example of Trolley Wire Tracing Control in Trolley Wire Linkage Control and Tracing Control>
Control and Tracing Control>

Figure 26:
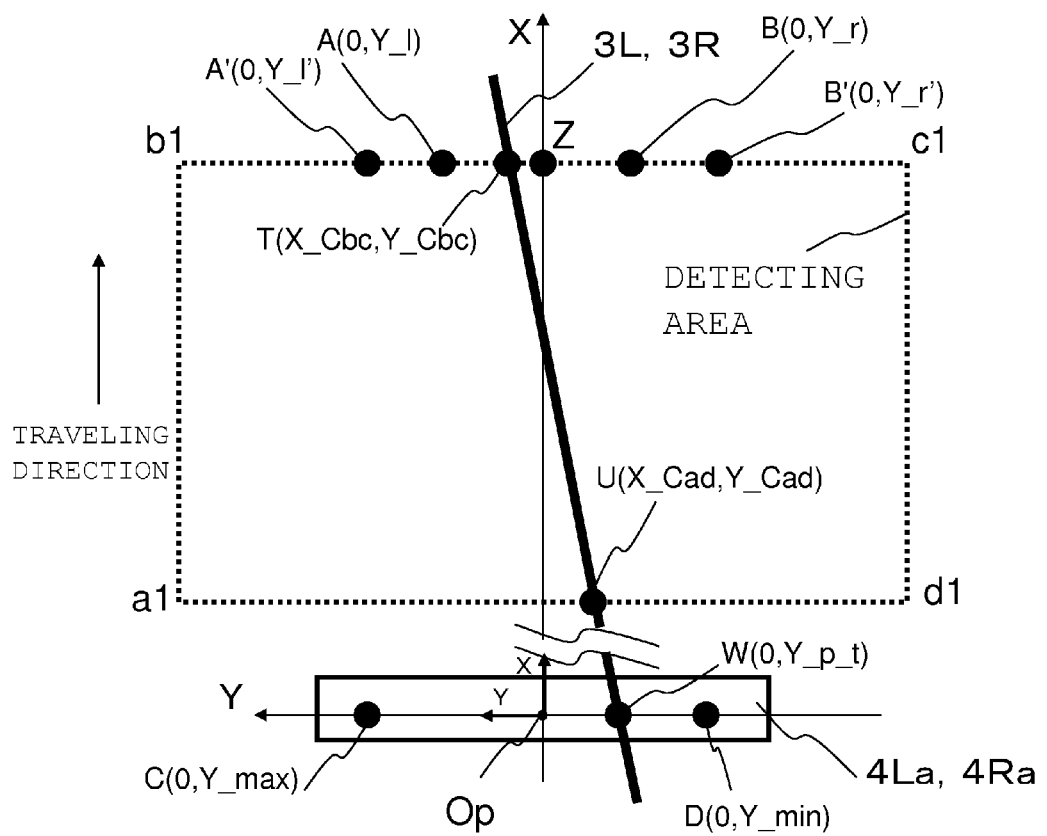
FIG. 26 is a schematic diagram similar to FIGS. 21 and 24, showing the trolley wire detecting area and the coordinate system in a case where first and second threshold values are set.
Figure 27:
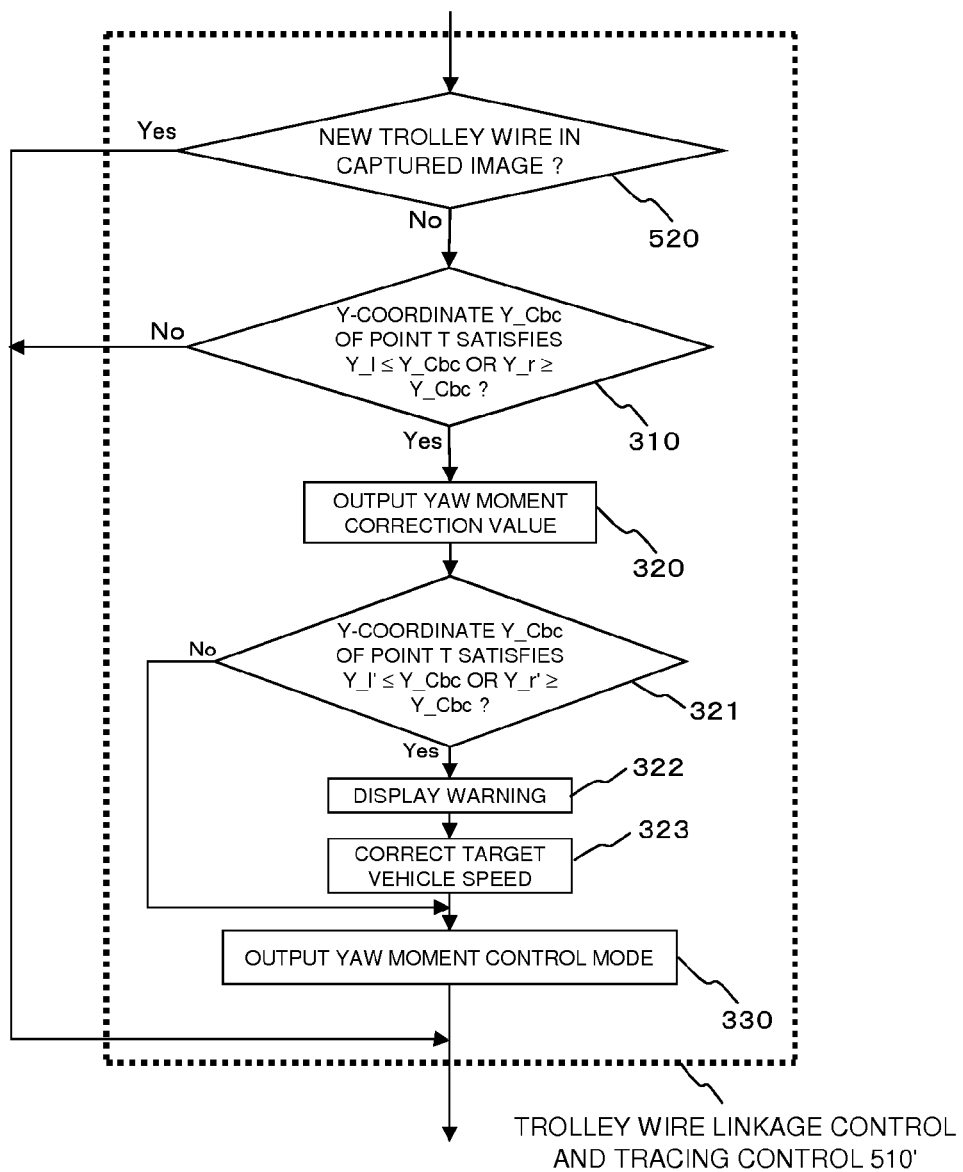
FIG. 27 is a flow chart showing another example of a trolley wire tracing control step in the flow chart of FIG. 23.

Next, another example of the trolley wire tracing control in the trolley wire linkage control and tracing control will be explained below referring to FIGS. 26-29. FIG. 26 is a schematic diagram similar to FIGS. 21 and 24, wherein deviation monitoring points for the trolley wire tracing control have been set. FIG. 27 is a flow chart showing step 510' which is executed instead of the trolley wire linkage control and tracing control step 510 in the flow chart of FIG. 23.

As shown in FIG. 26, a point A' (second threshold value) at a position outside (with a larger Y-coordinate value than) the point A and with a Y-coordinate value Y_l' and a point B' (second threshold value) at a position outside (with a smaller negative Y-coordinate value than) the point B and with a Y-coordinate value Y_r' have been set as the deviation monitoring points for the trolley wire tracing control.

In FIG. 27, the process from the start to the step 320 (calculation of the yaw moment correction value) via the step 520 is identical with that in FIG. 23 which has been explained above. In step 321 after the step 320, whether the target point T is situated between the points A' and B' (Y_l'≤Y_Cbc, Y_r'≥Y_Cbc) or not is judged (step 321). If affirmative, a warning for urging the driver to correct the steering is issued by sound and/or display (step 322) since there is a possibility that the vehicle deviates from the trolley traveling lane.

Figure 28:
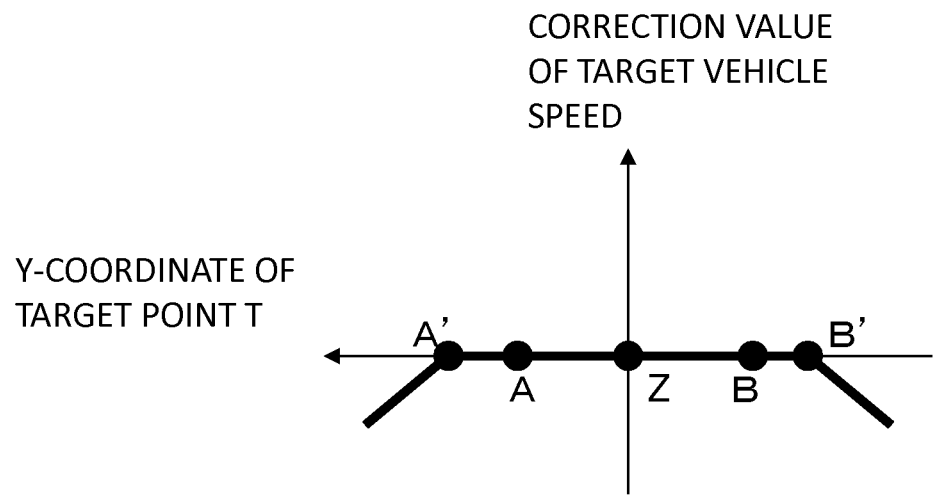
FIG. 28 is a schematic diagram showing an example of a method for calculating a target vehicle speed correction value (for correcting the target vehicle speed to the decreasing side) depending on the position of the target point.

In the next step 323, the target vehicle speed is corrected depending on the position of the target point T. FIG. 28 is a schematic diagram showing an example of a method for calculating a target vehicle speed correction value in this case. As shown in FIG. 28, when the target point T does not exist between the points A' and B', the target vehicle speed correction value is calculated so as to reduce the target vehicle speed depending on the degree of deviation from the points A' and B'. Specifically, in the range outside the point A' (where Y_Cbc is positive), the correction value on the side of decreasing the target vehicle speed is increased with the increase in Y_Cbc. In the range outside the point B' (where Y_Cbc is negative), the correction value on the side of decreasing the target vehicle speed is decreased with the decrease in Y_Cbc. According to this calculation, when the target point T does not exist between the points A' and B' (i.e., when the absolute value of the deviation Y_Cbc between the representative point Z and the target point T is greater than the absolute value of the Y-coordinate value Y_l' of the point A' or the absolute value of the Y-coordinate value Y_r' of the point B' as the second threshold value), control is executed to decrease the traveling speed with the increase in the absolute value of the deviation Y_Cbc. Decreasing the vehicle speed as above is effective for lightening the operating load on the driver and giving a feeling of security to the driver.

Figure 29:
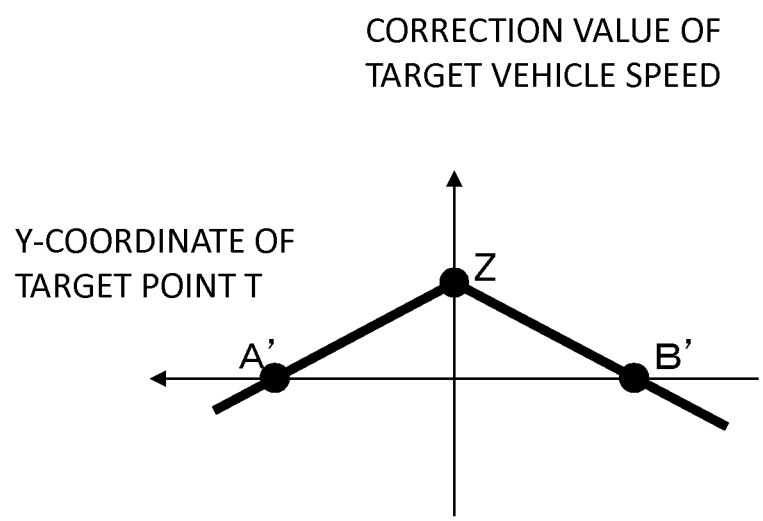
FIG. 29 is a schematic diagram showing an example of a method for calculating the target vehicle speed correction value (for correcting the target vehicle speed to the increasing side) depending on the position of the target point.

FIG. 29 is a schematic diagram showing another example of the method for calculating the target vehicle speed correction value. As shown in FIG. 29, when the target point T exists between the points A' and B', the correction may be made to increase the target vehicle speed as target point T approaches the representative point Z. Specifically, in the range inside the point A' (where Y_Cbc is positive), the correction value on the side of increasing the target vehicle speed is increased with the decrease in Y_Cbc. In the range inside the point B' (where Y_Cbc is negative), the correction value on the side of increasing the target vehicle speed is decreased with the increase in Y_Cbc. According to this calculation, when the target point T exists between the points A' and B' (i.e., when the absolute value of the deviation Y_Cbc between the representative point Z and the target point T is less than the absolute value of the Y-coordinate value Y_l' of the point A' or the Y-coordinate value Y_r' of the point B' as the second threshold value)), control is executed to increase the traveling speed with the decrease in the absolute value of the deviation Y_Cbc. Increasing the vehicle speed as above is effective for increasing the working efficiency.

Figure 30:
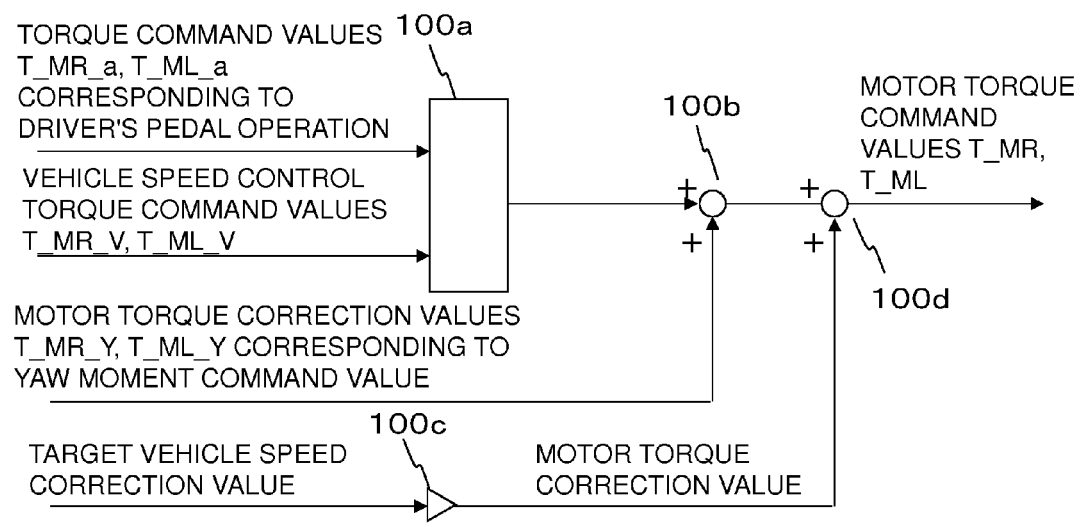
FIG. 30 is a schematic diagram similar to FIG. 10, showing a method for generating motor torque according to the target vehicle speed correction value.

FIG. 30 is a schematic diagram similar to FIG. 10, showing a method for generating motor torque according to the target vehicle speed correction value. As shown in FIG. 30, the target vehicle speed correction value calculated as above is converted into a motor torque command value by a conversion unit 100c by multiplying the target vehicle speed correction value by a gain factor. Subsequently, the motor torque command values T_MR and T_ML are calculated by a calculation unit 100d by adding the motor torque command value (corresponding to the target vehicle speed correction value) calculated by the conversion unit 100c to the motor torque command values calculated by the calculation unit 100b (acquired by adding the motor torque correction values T_MR_Y and T_ML_Y corresponding to the yaw moment command value generated by the yaw moment control unit 102 (FIG. 8) to the torque command values selected by the processing unit 100a).

Next, the yaw moment control mode in the case where the target vehicle speed is corrected to a lower value according to the target vehicle speed correction value shown in FIG. 28 will be explained. As shown in FIG. 9, in cases where a yaw moment has to be generated when the right and left motors are outputting 100% motor torque, it is necessary to reduce the motor torque of one of the right and left motors. The reduction of the motor torque of one of the motors leads to a drop in the vehicle speed since the vehicle cannot maintain the present speed with the reduced motor torque. Thus, in cases where the target vehicle speed is corrected to a lower value, the yaw moment correction may be made not by the steerage torque correction but by the correction of the motor torque, by which both the control to give a yaw moment to the vehicle 1 by controlling the right and left electric motors 6R and 6L and the control of the traveling speed are carried out. Consequently, efficient control, achieving both the deceleration and the generation of the yaw moment at the same time, can be carried out.

Other Examples

Figure 31:
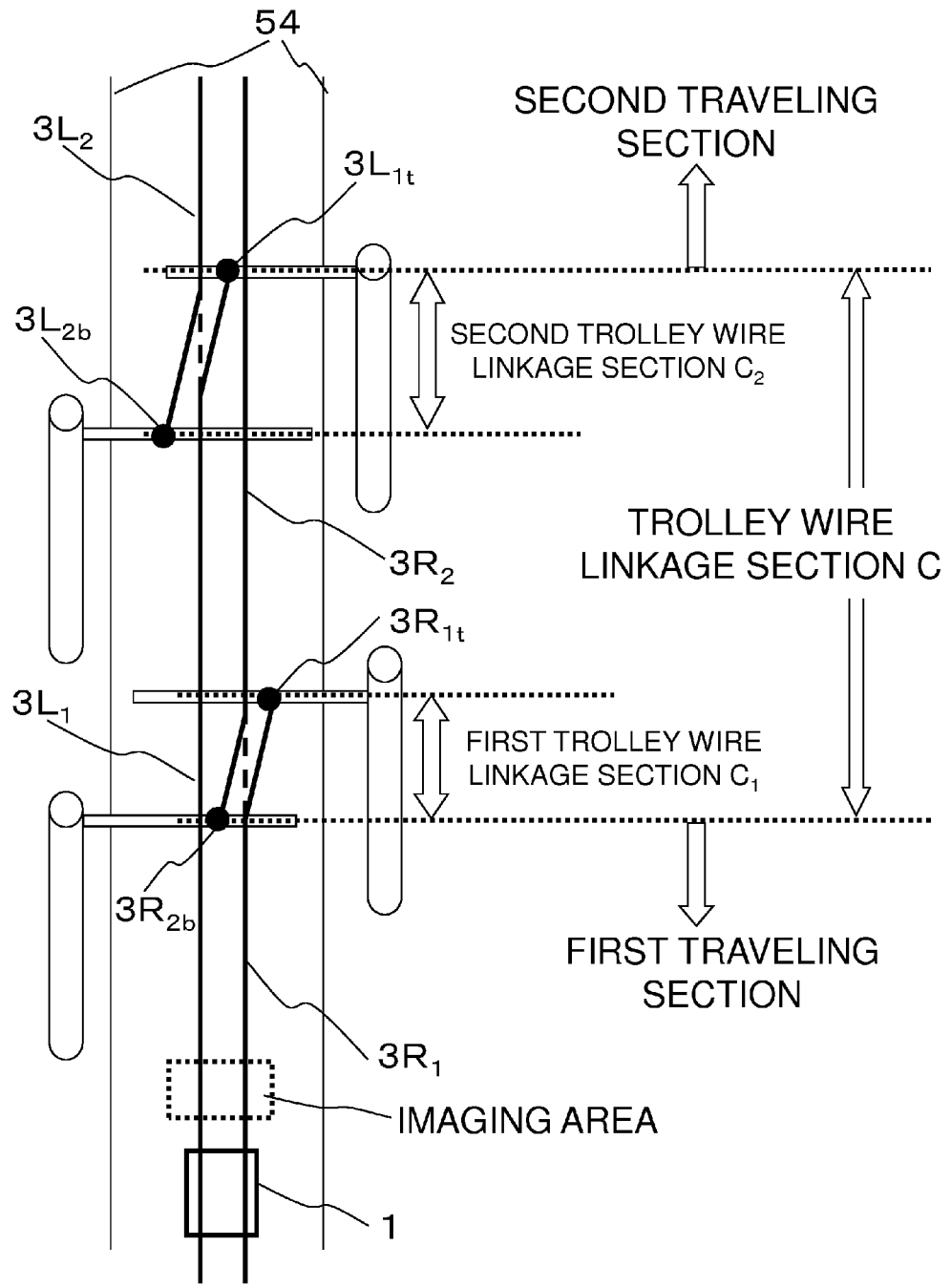
FIG. 31 is a schematic diagram showing an example of a trolley traveling section in a case where the linkage sections of the right and left trolley wires are not at the same position.

Trolley wires used in ordinary mines include those of positive polarity (a third trolley wire $3R_1$ included in the first trolley wires and a fifth trolley wire $3R_2$ included in the second trolley wires) and those of negative (grounded) polarity (a fourth trolley wire $3L_1$ included in the first trolley wires and a sixth trolley wire $3L_2$ included in the second trolley wires) as shown in FIG. 31. Thus, there are cases where linkage sections of the trolley wires (a first trolley wire linkage section $C_1$ where the terminating end part $3R_{1t}$ of the third trolley wire $3R_1$ and the beginning end part $3R_{2b}$ of the fifth trolley wire $3R_2$ extend in parallel, and a second trolley wire linkage section $C_2$ where the terminating end part $3L_{1t}$ of the fourth trolley wire $3L_1$ and the beginning end part $3L_{2b}$ of the sixth trolley wire $3L_2$ extend in parallel) appear at different positions, for example.

In such cases, in the first traveling section before the vehicle reaches the first trolley wire linkage section $C_1$, the control is executed by the vehicle state quantity calculation unit 50b and the vehicle state quantity control unit 50c so as to set the representative points T and U on the third trolley wire $3R_1$ and trace the third trolley wire $3R_1$ based on the information detected by the image information processing unit 50a. In the first trolley wire linkage section $C_1$, the fourth trolley wire $3L_1$ captured by the camera is in the ordinary straight state. Therefore, when the vehicle has reached the first trolley wire linkage section $C_1$ and the fifth trolley wire $3R_2$ has been detected, the control for tracing the third trolley wire $3R_1$ is stopped and the control is switched so as to trace the fourth trolley wire $3L_1$. The tracing of the fourth trolley wire $3L_1$ is continued before the vehicle reaches the second trolley wire linkage section $C_2$. When the vehicle has reached the second trolley wire linkage section $C_2$ and the sixth trolley wire $3L_2$ has been detected, the control for tracing the fourth trolley wire $3L_1$ is stopped and the control is switched so as to trace the fifth trolley wire $3R_2$.

According to this method, in the first trolley wire linkage section $C_1$, the control for tracing the third trolley wire $3R_1$ is stopped and the yaw moment control is performed so as to trace the fourth trolley wire $3L_1$ as a straight section. This allows the vehicle to carry out stable trolley traveling without tracing the deviating third trolley wire $3R_1$. In the second trolley wire linkage section $C_2$, the control for tracing the fourth trolley wire $3L_1$ is stopped and the yaw moment control is performed so as to trace the fifth trolley wire $3R_2$. This allows the vehicle to shift to the tracing of the fifth trolley wire $3R_2$ without tracing the deviating fourth trolley wire $3L_1$.

In such cases, the use of only one camera for the detection of the two trolley wires 3R and 3L requires an appropriate detection logic for recognizing each of the right and left trolley wires and detecting each of the corresponding new trolley wires. Such a configuration can cause complication of the logic even though the system can be constructed with the minimum number of cameras. Therefore, arranging right and left cameras for the right and left trolley wires 3R and 3L, respectively, and using each camera for individually shooting each trolley wire (so that the processing for detecting the new trolley wire becomes the simplest) is robust in terms of system stability and leads to simplification of the detection logic. Consequently, low-cost system construction is possible depending on the situation.

In the above embodiments, the vehicle traveling in a section like the one shown in FIG. 12 is judged to have reached the trolley wire linkage section when the second trolley wire $3R_2/3L_2$ is detected. However, the judgment that the vehicle is traveling in the trolley wire linkage section C may also be made when the first trolley wire $3R_1/3L_1$, which has been installed substantially in parallel with the vehicle's traveling direction in the imaging area a, b, c, d, starts approaching (inclining toward) either the side a-b or the side c-d (toward the terminating end part $3R_{1t}/3L_{1t}$) and the inclination is detected.

Further, while the outputting of the yaw moment for making the vehicle trace the trolley wire $3L_1$, $3L_2$, $3R_1$, $3R_2$ is continued in the first and second traveling sections in the explanation of the above embodiments, the control may also be executed so as to perform the calculation of the yaw moment correction value (for making the vehicle trace the trolley wires) and the yaw moment control only in a prescribed traveling section included in the first or second traveling section.

Figure 32:
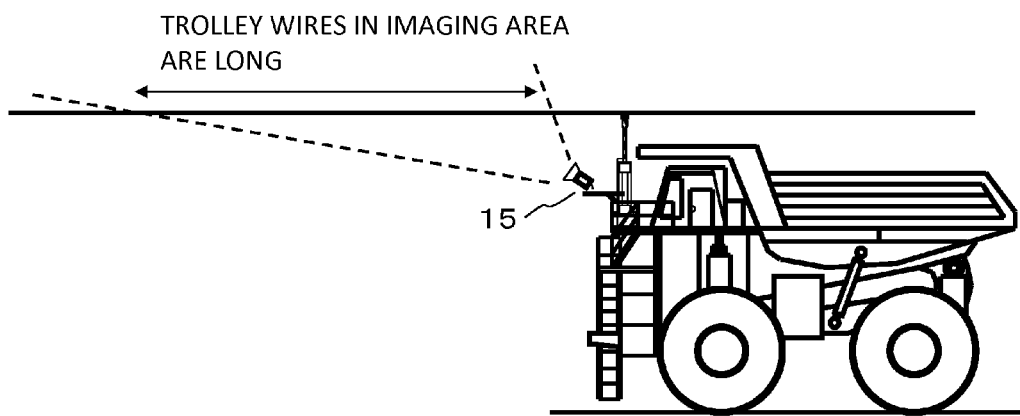
FIG. 32 is a schematic diagram similar to FIG. 13, showing an example in which the shooting direction of the camera is shifted forward.

Furthermore, while the camera used as the trolley wire detecting device is pointed directly upward in the above explanation, the camera may also be set to capture images in a forward and upward direction from the vehicle as shown in FIG. 32. Such camera setting facilitates the detection/recognition of the trolley wires as the target of the tracing since the parts of the trolley wires shot with the camera in the vehicle's traveling direction are long. On the other hand, noise caused by the scenery included in the imaging area increases as the imaging area is shifted forward. Therefore, the imaging area of the camera may be adjusted properly depending on the environment in which the present invention is employed.

DESCRIPTION OF REFERENCE CHARACTERS 1 vehicle
2 vessel
3L, 3R trolley wire
$3L_1$, $3R_1$ first trolley wire
$3L_{1t}$, $3R_{1t}$ first trolley wire terminating end part
$3L_2$, $3R_2$ second trolley wire
$3L_{2b}$, $3R_{2b}$ second trolley wire beginning end part
4L, 4R power collector
4La, 4Ra slider
4a hydraulic piston device
4b hydraulic piston
4c rod
4d hydraulic line
4e hydraulic device
4f insulator
4g electric wire
4h elevation command signal
5L, 5R rear wheel
6L, 6R electric motor
6La, 6Ra output shaft
7L, 7R decelerator
11 accelerator pedal
12 retarder pedal
13 shift lever
14 combined sensor
15 camera
16L, 16R electromagnetic pickup sensor
21 engine
21a electronic governor
22 AC generator
23 rectifier circuit
24 sensing resistor
25 capacitor
26 chopper circuit
27 grid resistor
28 other engine load
30 inverter control device
30a torque command calculation unit
30b motor control calculation unit
30c inverter (switching element)
31 elevation control device
32 steering control device
32a conversion unit
32b calculation unit
32c conversion unit
32d calculation unit
40 steering device
41 steering wheel
42 reaction force motor having a steering angle sensor
43 steerage motor having a steerage angle sensor
44 rack-and-pinion gear
45L, 45R front wheel
50 vehicle control device
50a image information processing unit
50b vehicle state quantity calculation unit
50c vehicle state quantity control unit
$50c_1$ calculation unit
$50c_2$ conversion unit
$50c_3$ conversion unit
$50c_4$ calculation unit
51 illuminating device
52 insulator
53 support
54 lane edge
100 controller
100a processing unit
100b calculation unit
101 vehicle speed control unit
101a calculation unit
101b conversion unit
101c switch unit
101d zero output unit
102 yaw moment control unit
102a calculation unit
102b steering torque control unit
102c motor torque control unit
102d optimum distribution control unit
102e switch unit
200 control device
C trolley wire linkage section
$C_1$ first trolley wire linkage section
$C_2$ second trolley wire linkage section
P, Q, R, S target point
P', Q', R', S' representative point
T target point
Z representative point (control point)
e_Lad deviation
θ_L inclination
Y_Cbc deviation
θ_t inclination
Y_l, Y_r Y-coordinate value of point A, B (first threshold value)
Y_l', Y_r' Y-coordinate value of point A', B' (second threshold value)

The invention claimed is:

1. An electrically driven dump truck which travels on a ground including a first traveling section in which at least one first trolley wire ($3R_1$, $3L_1$) is installed, a second traveling section in which at least one second trolley wire ($3R_2$, $3L_2$) is installed, and a trolley wire linkage section (C) in which a terminating end part ($3R_{1t}$, $3L_{1t}$) of the first trolley wire and a beginning end part ($3R_{2b}$, $3L_{2b}$) of the second trolley wire extend in parallel, by use of electric power received from the first trolley wire and the second trolley wire by elevating a slider (4Ra, 4La) of a power collector (4R, 4L) provided on a vehicle (1) to be movable up and down and making the slider (4Ra, 4La) successively contact the first trolley wire and the second trolley wire, the electrically driven dump truck comprising:
a trolley wire detecting device (15) which is provided on the vehicle and detects the first trolley wire and the second trolley wire from below when the dump truck is traveling; and
a control device which executes the following control based on information detected by the trolley wire detecting device:

giving a yaw moment to the vehicle in such a manner that the vehicle travels while tracing the first trolley wire before the vehicle reaches the trolley wire linkage section;

stopping the control to give the yaw moment when the vehicle is traveling in the trolley wire linkage section; and giving a yaw moment to the vehicle in such a manner that the vehicle travels while tracing the second trolley wire after the vehicle has passed through the trolley wire linkage section, wherein, when the trolley wire detecting device has detected the first trolley wire, the control device calculates at least one representative point of the vehicle and at least one target point situated on the first trolley wire based on the information detected by the trolley wire detecting device and executes control to give a yaw moment to the vehicle in such a manner that the representative point approaches the target point, and wherein, when the trolley wire detecting device has detected the second trolley wire, the control device calculates at least one representative point of the vehicle and at least one target point situated on the second trolley wire based on the information detected by the trolley wire detecting device and executes control to give a yaw moment to the vehicle in such a manner that the representative point approaches the target point.

2. The electrically driven dump truck according to claim 1, wherein:

the first trolley wire includes two trolley wires: a third trolley wire ($3R_1$) and a fourth trolley wire ($3L_1$), and the second trolley wire includes two trolley wires: a fifth trolley wire ($3R_2$) and a sixth trolley wire ($3L_2$), and the trolley wire linkage section includes a first trolley wire linkage section ($C_1$) in which a terminating end part ($3R_{1t}$) of the third trolley wire and a beginning end part ($3R_{2b}$) of the fifth trolley wire extend in parallel and a second trolley wire linkage section ($C_2$) in which a terminating end part ($3L_{1t}$) of the fourth trolley wire and a beginning end part ($3L_{2b}$) of the sixth trolley wire extend in parallel at a position different from the first trolley wire linkage section, and the control device executes the following control based on the information detected by the trolley wire detecting device:

giving a yaw moment to the vehicle in such a manner that the vehicle travels while tracing the third trolley wire before the vehicle reaches the first trolley wire linkage section;

stopping the control to give the yaw moment according to the third trolley wire and switching to control to give a yaw moment to the vehicle in such a manner that the vehicle travels while tracing the fourth trolley wire when the vehicle has reached the first trolley wire linkage section; and stopping the control to give the yaw moment according to the fourth trolley wire and switching to control to give a yaw moment to the vehicle in such a manner that the vehicle travels while tracing the fifth trolley wire when the vehicle has reached the second trolley wire linkage section.

3. The electrically driven dump truck according to claim 1, wherein the control device judges that the vehicle is traveling in the trolley wire linkage section when the second trolley wire is detected by the trolley wire detecting device.

4. The electrically driven dump truck according to claim 1, further comprising right and left electric motors (6R, 6L) for traveling, wherein the control device executes both the control to give a yaw moment to the vehicle and traveling speed control by controlling the right and left electric motors.

5. The electrically driven dump truck according to claim 1, further comprising right and left electric motors (6R, 6L) for traveling and a steering device (40), wherein:

the control device includes a vehicle control device (50), a controller (100), an inverter control device (30) and a steering control device (32), and the vehicle control device calculates a yaw moment correction value, for the control to give a yaw moment to the vehicle in such a manner that the vehicle travels while tracing the first and second trolley wires, based on the information detected by the trolley wire detecting device, and the controller controls at least the right and left electric motors or the steering device by using the inverter control device and/or the steering control device based on the yaw moment correction value.

6. The electrically driven dump truck according to claim 1, wherein the trolley wire detecting device includes:

a camera (15) which is provided on the vehicle and continuously captures images of the first and second trolley wires when the dump truck is traveling; and an illuminating device (51) which is provided on the vehicle and illuminates the first and second trolley wires.

\* \* \* \* \*